US008223221B2

(12) United States Patent
Wada et al.

(10) Patent No.: US 8,223,221 B2
(45) Date of Patent: Jul. 17, 2012

(54) IMAGING APPARATUS, IMAGING METHOD, STORAGE MEDIUM, AND INTEGRATED CIRCUIT FOR REMOVING IMAGES INFLUENCED BY FLASHING LIGHT

(75) Inventors: Noriaki Wada, Hyogo (JP); Tadami Mine, Osaka (JP); Tadayuki Inoue, Hyogo (JP)

(73) Assignee: Panasonic Corporation, Osaka (JP)

(*) Notice: Subject to any disclaimer, the term of this patent is extended or adjusted under 35 U.S.C. 154(b) by 359 days.

(21) Appl. No.: 12/612,218

(22) Filed: Nov. 4, 2009

(65) Prior Publication Data

US 2010/0110225 A1 May 6, 2010

(30) Foreign Application Priority Data

Nov. 5, 2008 (JP) ................................ 2008-284026
Nov. 14, 2008 (JP) ................................ 2008-292638
Jun. 4, 2009 (JP) ................................ 2009-135043

(51) Int. Cl.
*H04N 9/73* (2006.01)
(52) U.S. Cl. .................................................... 348/226.1
(58) Field of Classification Search .... 348/226.1–228.1; 99/226.1–228.1
See application file for complete search history.

(56) References Cited

U.S. PATENT DOCUMENTS 6,999,118 B2 * 2/2006 Suzuki ....................... 348/226.1
7,042,524 B2 * 5/2006 Onagawa ....................... 348/687
2007/0046790 A1 * 3/2007 Nakasuji et al. ........... 348/226.1
2008/0309791 A1 * 12/2008 Nishiwaki et al. ......... 348/226.1
2009/0167894 A1 * 7/2009 Nakaoka et al. ........... 348/226.1

FOREIGN PATENT DOCUMENTS

JP 2007-306225 11/2007

* cited by examiner

*Primary Examiner* — Timothy J Henn
(74) *Attorney, Agent, or Firm* — Wenderoth, Lind & Ponack, L.L.P.

(57) ABSTRACT

An imaging apparatus that removes horizontal bands of high-luminance noise caused by incoming flash light and outputs an image whose continuity as a moving picture is maintained. The imaging apparatus includes: an imaging unit that drives an image sensor at a frame rate n times a predetermined video format and outputs an n time-speed image signal; a flashing light detection unit; an average computation unit; and a speed conversion unit. When flashing light is detected, frames containing flashing light are removed from the image signal outputted by the imaging unit, and the average of the remaining frames is calculated, thereby obtaining an average image signal. When flashing light has not been detected, the average of n frames is calculated without removing frames, thereby obtaining an average image signal. The average image signal is converted to 1/n speed and outputted in the predetermined video format.

12 Claims, 18 Drawing Sheets

100
1 Imaging Unit
3 Average Computation Unit
4 Speed Conversion Unit
5 Image Processing Unit
Optical Input
Output
Flashing Light Detection Signal
2 Flashing Light Detection Unit No Shift in Center of Temporal Direction Shift in Center of Temporal Direction (Number 1)

Sig_in
Sig_out
T1
T2
T3
t1
t2
t3
C7
C8
C9
1 2 3 4 5 6 7 8 9 10 11 12 13 14 15 16 17 18
3+4+5+6
5+6+7+8
10+11+12+13

Sig_in
Sig_out
T1
T2
T3
t1
t2
t3
C10
C11
C12
1 2 3 4 5 6 7 8 9 10 11 12 13 14 15 16 17 18
3+4+5+6
7+8+9+10
10+11+12+13

Shift in Center of Temporal Direction (Number 2)

IMAGING APPARATUS, IMAGING METHOD, STORAGE MEDIUM, AND INTEGRATED CIRCUIT FOR REMOVING IMAGES INFLUENCED BY FLASHING LIGHT

This application claims priority to Japanese Patent Application No 2008-284026 filed on Nov. 5, 2008, Japanese Patent Application No 2008-292638 filed on Nov. 14, 2008, and Japanese Patent Application No 2009-135043 filed on Jun. 4, 2009. The entire disclosure of Japanese Patent Application No 2008-284026 filed on Nov. 5, 2008, Japanese Patent Application No 2008-292638 filed on Nov. 14, 2008, and Japanese Patent Application No 2009-135043 filed on Jun. 4, 2009 is hereby incorporated herein by reference.

BACKGROUND OF THE INVENTION

1. Field of the Invention

The present technique relates to a technique employed in an imaging apparatus that captures continuous images, such as a digital camera, a video camera, or the like, and relates to a technique for removing images negatively influenced by incoming flash light.

2. Description of the Related Art

There exists, as a conventional signal processing apparatus (imaging apparatus) that removes images negatively influenced by incoming flash light, an apparatus as described, for example, in Patent Document 1 (JP 2007-306225A). FIG. 16 is a block diagram of this conventional imaging apparatus 900. Although the aforementioned Patent Document 1 describes processing for recording images into a recording unit, an example in which an image signal is outputted to the exterior shall be described here.

As shown in FIG. 16, the imaging apparatus 900 has a CMOS image sensor, a sensor driving circuit, and an analog/digital converter, and includes an imaging unit 950 that captures a continuous image and outputs a digital sequential scan image signal having, for example, 720 active vertical lines, 1280 active horizontal pixels, and a frame frequency of 60 Hz, as well as an image processing unit 951 that performs gamma processing (gamma correction), contour emphasis, and the like on the output from the imaging unit 950. The imaging apparatus 900 also includes a flashing light detection unit 952 that detects the presence/absence of incoming flash light by comparing the images in sequential frames in the output from the imaging unit 950, and an output control unit 953 that performs control so as to switch between outputting the image signal outputted by the image processing unit 951 directly or outputting images that have been accumulated, based on a signal outputted from the flashing light detection unit 952 (a flashing light detection signal).

FIG. 17 shows a block diagram of the output control unit 953 of the conventional imaging apparatus 900. The output control unit 953 is configured, for example, of the circuit shown in FIG. 17.

As shown in FIG. 17, the output control unit 953 includes a memory circuit 954 that stores one frame's worth of the image signal outputted from the image processing unit 951, and a switching circuit 955 that switches between and outputs the signal outputted from the memory circuit 954 or the signal inputted from the image processing unit 951 based on the signal outputted by the flashing light detection unit 952 (the flashing light detection signal).

Operations of the conventional imaging apparatus 900 configured as described above shall be described hereinafter.

First, in the imaging unit 950, the sensor driving circuit supplies a driving signal to the CMOS image sensor; an optical signal (light from a subject) that enters the CMOS image sensor is then converted to an electric signal through photoelectric conversion, and the electric signal obtained through the photoelectric conversion is then converted into a digital sequential scan image signal through analog/digital conversion. The digital sequential scan image signal generated by the imaging unit 950 is then outputted from the imaging unit 950. This digital sequential scan image signal is then supplied (outputted) to the image processing unit 951 and the flashing light detection unit 952.

The image processing unit 951 performs gamma processing, contour emphasis processing, and the like on the inputted digital sequential scan image signal, and then outputs the processed image signal to the output control unit 953.

Meanwhile, the flashing light detection unit 952 calculates the average luminance level of each frame for the inputted digital sequential scan image signal, and then compares the average luminance level of a frame of the inputted signal with the average luminance level of the frame immediately previous thereto. If the average luminance level has increased significantly, it is determined that the captured image was obtained by the imaging unit 950 in an environment in which an incoming flash light, such as a flash, was present. For example, if the average luminance level of a frame of the inputted signal has increased 100% or more compared to the average luminance level of the frame immediately previous thereto, the flashing light detection unit 952 determines that an incoming flash light such as a flash has been detected (that is, that the image was captured in environment in which an incoming flash light was present), sets the signal value of the flashing light detection signal to "1", and outputs the flashing light detection signal. Note that when incoming flash light has not been detected, the flashing light detection unit 952 sets the signal value of the flashing light detection signal to "0" and outputs the flashing light detection signal. This flashing light detection signal and the image signal outputted from the image processing unit 951 are inputted into the output control unit 953.

In the output control unit 953, the image signal outputted from the image processing unit 951 is inputted into the memory circuit 954. The memory circuit 954 writes and stores one frame's worth of image signal, delays the signal by an amount of time equivalent to one frame, and outputs the image signal. In the case where the signal value of the flashing light detection signal outputted from the flashing light detection unit 952 is "1", or in other words, in the case where flashing light has been detected, the memory circuit 954 does not write a new image signal, and instead holds the image signal of the previous frame and then repeats the output of the image signal of that same frame. The switching circuit 955 switches output between the image signal outputted from the image processing unit 951 and the image signal outputted from the memory circuit 954 based on the flashing light detection signal. In the case where the signal value of the flashing light detection signal outputted from the flashing light detection unit 952 is "1", or in other words, in the case where the flashing light detection signal indicates that flashing light has been detected, the switching circuit 955 selects the image signal outputted from the memory circuit 954 and outputs that signal. However, in the case where the signal value of the flashing light detection signal outputted from the flashing light detection unit 952 is "0", or in other words, in the case where the flashing light detection signal indicates that flashing light has not been detected, the switching circuit 955 selects the image signal outputted from the image processing unit 951 and outputs that signal.

Next, operations of the imaging apparatus 900 shall be described in more detail using FIG. 18.

FIG. 18 is a diagram illustrating negative influence on an image (an image captured by the imaging apparatus 900) caused by incoming flash light in the conventional imaging apparatus 900.

(1) to (4) in FIG. 18 indicate sequential frames, and the timing at which the CMOS image sensor is receiving light is indicated by a vertical synchronization signal (the uppermost section of FIG. 18).

The "upper side of the image" shown in FIG. 18 refers to the upper side of the active screen (the portion of the screen corresponding to the image that is actually displayed when an image signal obtained by the imaging apparatus is displayed in a display apparatus (that is, the image excluding portions such as the synchronization signals)). In the CMOS image sensor, the first line of the active screen receives light during the period indicated by the arrow in FIG. 18. Because the timing at which light is received shifts slightly with each line in the CMOS image sensor, the 720th line is shifted by approximately 1/60 of a second relative to the first line. Here, in the case where incoming flash light has occurred at the timing indicated by the star in FIG. 18, that flashing light will be received in the lines that compose the lower side of the screen in the frame (2) and the lines that compose the upper side of the screen in the frame (3). When, in such a state, the image signal obtained by the imaging unit 950 is displayed in a display apparatus, a horizontal band of high luminance will appear across the two sequential frames in the displayed screen (video). The appearance of such a horizontal band of high luminance will impart a sense of visual unnaturalness in a user. Furthermore, in methods that perform compression using the correlation between continuous frames, such as, for example, processing that compresses according to the MPEG (Moving Picture Experts Group) method, processing an image signal in which the aforementioned horizontal band of high luminance has appeared causes negative influence, such as the occurrence of block noise, a decrease in compression rates, and so on.

Accordingly, with the conventional imaging apparatus 900 shown in FIG. 16, an image in a frame in which flashing light has been received is not outputted when incoming flash light has been detected; rather, the image of the frame immediately previous thereto is outputted. Therefore, the imaging apparatus 900 can prevent the appearance of horizontal bands of high luminance.

SUMMARY OF THE INVENTION

However, with the aforementioned conventional imaging apparatus, there is a problem in that when incoming flash light has been detected across two sequential frames, an image of the same frame is outputted across three frames, causing a loss of continuity as a moving picture.

For example, in the case of FIG. 18, a horizontal band of high luminance caused by incoming flash light appears in two frames (frames (2) and (3)), and thus the imaging apparatus 900 repeatedly outputs the image of the frame immediately previous to those two frames (that is, frame (1)). In other words, with the imaging apparatus 900, the same image (the image corresponding to frame (1)) is outputted across three frames, and thus when the image (video) obtained by the imaging apparatus 900 is displayed in the display apparatus, the video will be temporarily be displayed as a still image.

The present technique solves the aforementioned conventional problems, and it is an object thereof to provide an imaging apparatus, imaging method, program, and integrated circuit that eliminate horizontal bands of high luminance caused by incoming flash light and output images in which the continuity as a moving picture is maintained.

The imaging apparatus includes an imaging unit, a flashing light detection unit, and a format conversion unit.

The imaging unit has an image sensor, drives the image sensor at a frame rate n times that of a predetermined video format (where n is an integer of 2 or more), and converts an optical signal entering the image sensor into an electric signal, thereby obtaining an n time-speed image signal. The flashing light detection unit detects incoming flash light in the n time-speed image signal obtained by the imaging unit and outputs a flashing light detection signal indicating the result of detecting the incoming flash light. The format conversion unit outputs a image signal compliant with the predetermined video format by selecting image signals to be processed based upon the flashing light detection signal when generating the image signal compliant with the predetermined video format from the n time-speed image signal obtained by the imaging unit.

With this imaging apparatus, the format conversion unit converts the n time-speed image signal obtained by the imaging unit into the predetermined video format based on the flashing light detection signal so as to ensure the continuity of the image signal as a moving picture. For example, with this imaging apparatus, all of the frames influenced by flashing light are removed or all the frames influenced by flashing light are included (in other words, a middling process whereby a frame in which only the upper section of the screen is influenced by flashing light is included, and the following frame, in which only the lower section of the screen is influenced by flashing light, is excluded, is not performed), and thus the appearance of horizontal bands of high luminance can be prevented in the image signal in the predetermined video format, which is the final output (for example, an image signal having a frame frequency of 60 Hz corresponds to this). Furthermore, with this imaging apparatus, an image signal having a frame rate n times (where n is an integer of 2 or more) that of the predetermined video format (the n time-speed video signal) is the processing target; the process for eliminating the influence of flashing light is performed, after which format conversion is carried out, and an image signal having a 1× frame rate (an image signal in the predetermined video format) is thus outputted. In other words, with this imaging apparatus, the same frame image (a 1× frame image) is not outputted continuously multiple times. As a result, the continuity of the image signal as a moving picture can be maintained when the image signal obtained by the imaging apparatus is displayed in a display apparatus.

According to the present technique, it is possible to achieve an imaging apparatus, imaging method, program, and integrated circuit capable of eliminating horizontal bands of high luminance caused by incoming flash light and outputting images in which the continuity as a moving picture is maintained.

DETAILED DESCRIPTION OF THE INVENTION

Hereinafter, embodiments of the present technique shall be described with reference to the drawings.

First Embodiment

<1.1: Configuration of Imaging Apparatus>

Figure 1:
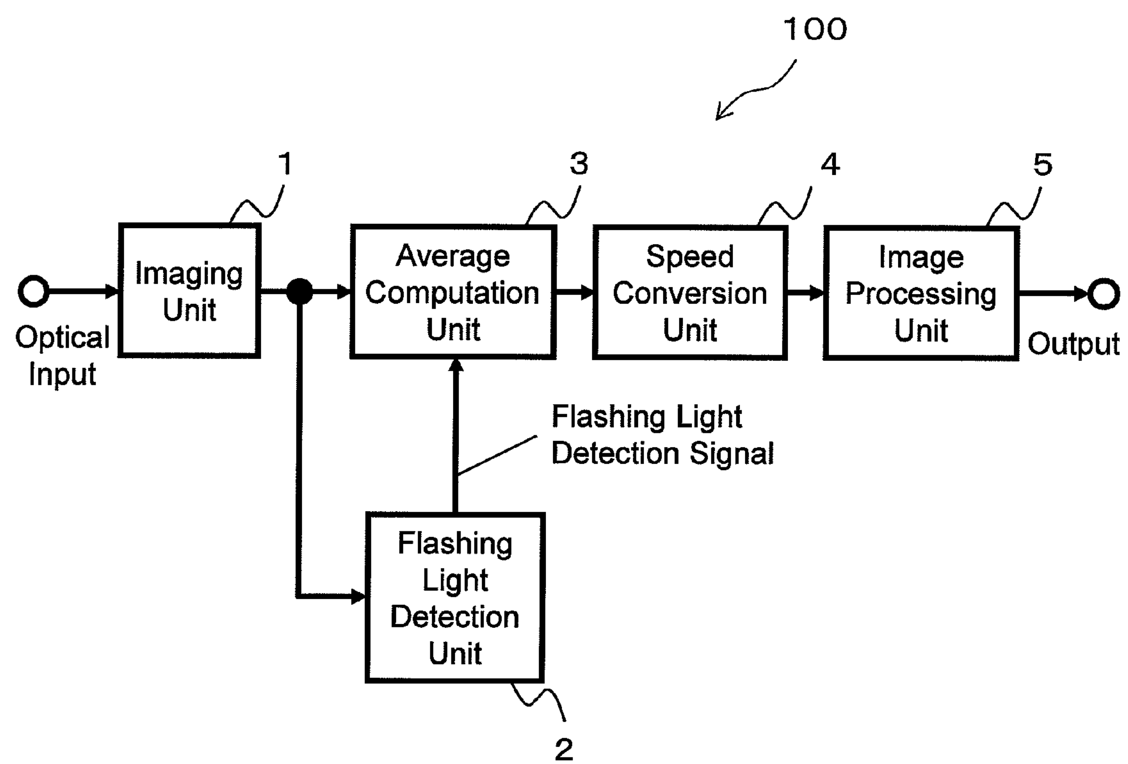
FIG. 1 is a block diagram of an imaging apparatus 100 according to a first embodiment.

FIG. 1 is a block diagram of an imaging apparatus 100 according to a first embodiment.

As shown in FIG. 1, the imaging apparatus 100 includes an imaging unit 1 that converts light from a subject into an electrical signal and obtains an image signal having a frame rate n times (where n is an integer greater than or equal to 3) that of a predetermined video format, a flashing light detection unit 2 that detects the presence/absence of incoming flash light from the image signal obtained by the imaging unit 1 and outputs the results of the detection as a flashing light detection signal, and an average computation unit 3 that generates an image signal in which the influence of the flashing light has been eliminated by averaging, based on the flashing light detection signal, the image signal of frames that have no flashing light. The imaging apparatus 100 also includes a speed conversion unit 4 that performs speed conversion on the image signal outputted from the average computation unit 3, and an image processing unit 5 that performs gamma processing, contour emphasis processing, and the like on the image signal outputted from the speed conversion unit 4.

Note that, for the sake of simplicity, the following descriptions are given assuming that the imaging unit 1 obtains an image signal having a frame rate 4 times that of a predetermined video format (or in other words, that n=4).

The imaging unit 1 has a CMOS image sensor (a CMOS-type image sensor (imaging element)), a sensor driving circuit, and an analog/digital converter; the imaging unit 1 converts light from a subject into an electric signal through photoelectric conversion and outputs that signal as a digital image signal to the flashing light detection unit 2 and the average computation unit 3. The imaging unit 1 captures a continuous image and outputs a digital sequential scan image signal having, for example, 720 active vertical lines, 1280 active horizontal pixels, and a frame frequency of 240 Hz (that is, 60 Hz×4). Note that, for the sake of simplicity, the following descriptions are given assuming that the image signal outputted from the imaging unit 1 is a digital sequential scan image signal having 720 active vertical lines, 1280 active horizontal pixels, and a frame frequency of 240 Hz.

The flashing light detection unit 2 is inputted with the image signal outputted from the imaging unit 1 and compares the images in each of sequential frames (the frame images formed by the image signal), detecting the presence/absence of incoming flash light. The flashing light detection unit 2 then outputs a flashing light detection signal, indicating the presence/absence of incoming flash light, to the average computation unit 3.

The average computation unit 3 is inputted with the image signal outputted from the imaging unit 1 and the flashing light detection signal outputted from the flashing light detection unit 2. The average computation unit 3 totals, for pixels in the same horizontal/vertical position in the frame images formed by the image signal, the pixel values (these correspond to signal values) in the same pixel positions across multiple frames, and then divides by the number of frames for which the totaling was performed, thereby calculating the average value for each pixel; an image signal in which the influence of incoming flash light has been eliminated is generated in this manner.

Figure 2:
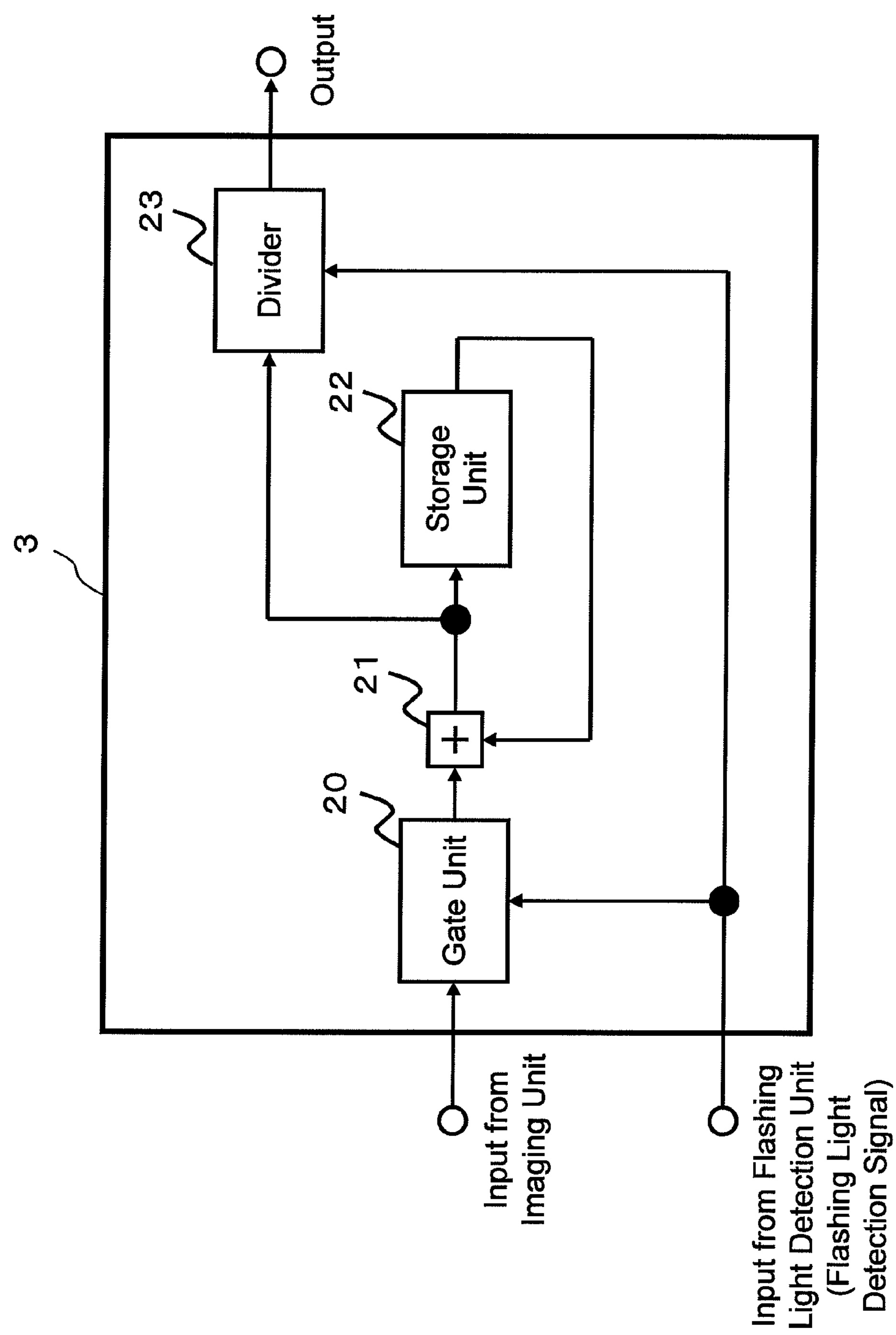
FIG. 2 is a block diagram of an average computation unit 3 according to the first embodiment.

An example of a specific configuration of the average computation unit 3 is shown in FIG. 2.

As shown in FIG. 2, the average computation unit 3 has a gate unit 20, an adder 21, a storage unit 22, and a divider 23.

The gate unit 20 is inputted with the image signal outputted from the imaging unit 1 and the flashing light detection signal, and outputs the image signal outputted from the imaging unit 1 directly to the adder 21 or outputs a zero signal (including no signal) to the adder 21 based on the flashing light detection signal (details shall be given later).

The adder 21 is inputted with the image signal outputted from the gate unit 20 and an image signal outputted from the storage unit 22, and adds the two image signals on a pixel-by-pixel basis; the adder 21 then outputs the image signal generated through this adding to the storage unit 22 and the divider 23.

The storage unit 22 is inputted with the image signal outputted from the adder 21, and stores the inputted image signal in units of which an image can be formed (here, as frames). The storage unit 22 then outputs the stored image signal to the adder 21. The storage unit 22 can be configured, for example, of a memory circuit such as a frame memory. Here, the storage unit 22 is a memory circuit (configured of hardware) that stores one 1/240 of a second frames' worth (one 240p frame) of the image signal outputted from the adder 21.

The divider 23 is inputted with the image signal outputted from the adder 21 and the flashing light detection signal, and divides, based on the flashing light detection signal, the image signal outputted from the adder 21 by the number of frames totaled by the adder 21. The divider 23 outputs the image signal obtained through this dividing to the speed conversion unit 4.

The speed conversion unit 4 converts the image signal outputted from the average computation unit 3 at a frame frequency of 240 Hz into a frame frequency of 60 Hz. In other words, the speed conversion unit 4 converts what is known as a 240p image signal into a 60p image signal by performing a frame rate conversion process.

The image processing unit 5 performs gamma processing, contour emphasis processing, and the like on the image signal outputted from the speed conversion unit 4.

<1.2: Operation of Imaging Apparatus>

Operations of the imaging apparatus 100 configured as described above shall be described hereinafter.

First, in the imaging unit 1, a driving signal is supplied from the sensor driving circuit (not shown), and a digital sequential scan image signal is obtained by performing photoelectric conversion on a light signal that has entered into the CMOS image sensor and furthermore performing analog/digital conversion on that signal. Note that compared to the imaging unit 950 of the conventional imaging apparatus 900 shown in FIG. 9, the imaging unit 1 drives the CMOS image sensor at 4× speed, and thus outputs a digital sequential scan image signal at a frame frequency of 240 Hz.

The digital sequential scan image signal obtained by the imaging unit 1 is outputted to the flashing light detection unit 2 and the average computation unit 3.

The flashing light detection unit 2 calculates the average luminance level of one frame's worth of the inputted digital sequential scan image signal (one frame's worth of 240p), and compares the average luminance level of the frames of the inputted signal to the average luminance level of the frame immediately previous thereto (one frame previous). Then, in the case where the average luminance level has increased significantly, the flashing light detection unit 2 determines that the imaging unit 1 obtained the captured image (digital sequential scan image signal) in an environment in which an incoming flash light, such as a flash, was present. For example, in the case where the average luminance level has increased 100% or more, the flashing light detection unit 2 determines that an incoming flash light, such as a flash, has been detected, sets the signal value of the flashing light detection signal to "1", and outputs the flashing light detection signal. On the other hand, in the case where an incoming flash light has not been detected, the flashing light detection unit 2 sets the signal value of the flashing light detection signal to "0" (or uses no signal), and outputs the flashing light detection signal. The flashing light detection signal generated by the flashing light detection unit 2 is then outputted to the average computation unit 3.

Note that in the imaging apparatus 100, if an incoming flash light has been detected by the flashing light detection unit 2 in a predetermined frame F1, it is determined that an incoming flash light has also been detected in a frame F2 that follows the frame F1, and thus, during the period from the frame F1 to the frame F2, or in other words, during the period in the present embodiment in which the image signal that forms the frames F1 and F2 is being processed, the flashing light detection unit 2 sets the signal value of the flashing light detection signal to "1" and outputs the flashing light detection signal.

Alternatively, another known method may be used to detect flashing light as long as that detection method is capable of detecting flashing light on a frame-by-frame basis.

The digital sequential scan image signal (image signal) obtained by the imaging unit 1 is inputted into the gate unit 20 of the average computation unit 3, and output control is performed based on the flashing light detection signal. To be more specific, if the value of the flashing light detection signal inputted into the gate unit 20 is "0", or in other words, if the flashing light detection signal indicates that incoming flash light has not been detected, it can be determined that the frame to be processed (the present frame) has not been influenced by incoming flash light, and therefore the image signal inputted into the gate unit 20 is outputted to the adder 21.

Meanwhile, if the value of the flashing light detection signal is "1", or in other words, if the flashing light detection signal indicates that incoming flash light has been detected, it can be determined that the frame to be processed (the present frame) has been influenced by incoming flash light, and therefore the value of the image signal outputted from the gate unit 20 the adder 21 is set to "0" (or no signal).

In the storage unit 22, all of the stored data is cleared once every 1/60 of a second. In other words, the stored data is cleared once every four frames at a frame frequency of 240 Hz (four frames at 240p).

In the adder 21, the output from the storage unit 22 and the output from the gate unit 20 are added, and the output of the adder 21 is written into the storage unit 22. To be more specific, the adder 21 can add four frames at a frame frequency of 240 Hz (four frames at 240p) for pixels in the same horizontal/vertical position in the frame images formed by the image signal (a process for totaling the pixel values in the same pixel positions). The image signal generated by the adder 21 (the adding result) is inputted into the divider 23, where division (a dividing process) is carried out based on the flashing light detection signal. In the divider 23, the division number (divisor) is determined as described hereinafter based on the number of frames in which flashing light was detected during the cycle of four frames at a frame frequency of 240 Hz (a period corresponding to four frames at 240p).

(A) When the number of frames in which flashing light was detected is "0", the division number is set to "4".

(B) When the number of frames in which flashing light was detected is "1", the division number is set to "3".

(C) When the number of frames in which flashing light was detected is "2", the division number is set to "2".

The divider 23 executes a division process on the image signal generated by the adder 21 using the division number determined as described above. Then, the image signal on which the division process was performed by the divider 23 is outputted to the speed conversion unit 4.

As described above, in the average computation unit 3, frames in which flashing light was detected during a cycle of four frames at a frame frequency of 240 Hz (a period corresponding to four frames at 240p) are removed, and only the image signals of frames in which flashing light has not been detected are added; the average value is then calculated by dividing by the number of frames in which flashing light was not detected, thereby generating an image signal in which the influence of flashing light has been removed.

Next, the speed conversion unit 4 converts the image signal with a frame rate of 240p as outputted from the average computation unit 3 into an image signal with a frame rate of 60p. To be more specific, the speed conversion unit 4 has a memory circuit (not shown); the speed conversion unit 4 writes, into the memory circuit (not shown), only the portion of the image signal with a frame rate of 4×, or a frame frequency of 240 Hz (the image signal with a frame rate 4 times 60p), that has had the average value calculated by the average computation unit 3, and reads out from that memory circuit at a timing corresponding to a frame frequency of 60 Hz. Through this, the speed conversion unit 4 performs speed conversion (frame rate conversion), thereby generating an image signal with a frame frequency of 60 Hz (a 60p image signal). Then, the image signal that has undergone speed conversion by the speed conversion unit 4 (the 60p image signal) is outputted to the image processing unit 5.

The image processing unit 5 performs gamma processing, contour emphasis processing, and the like on the inputted image signal (the 60p image signal). The image signal processed by the image processing unit 5 is then outputted from the image processing unit 5.

Figure 3:
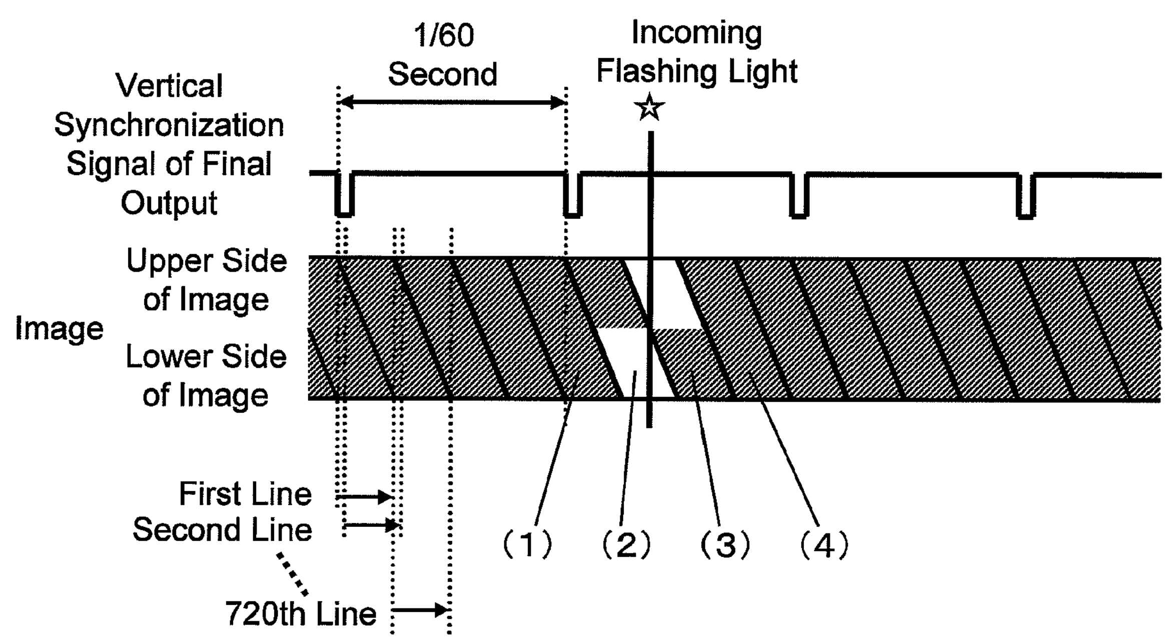
FIG. 3 is a diagram illustrating negative influence on an image caused by incoming flash light in imaging apparatuses 100 and 400 according to the first embodiment and a fourth embodiment.

Next, operations performed by the imaging apparatus 100 shall be described in more detail using FIG. 3.

FIG. 3 is a diagram illustrating negative influence on an image caused by incoming flash light in the imaging apparatus 100 according to the first embodiment of the present technique. (1) to (4) in FIG. 3 indicate the timing in sequential frames at which the CMOS image sensor receives light, based on the vertical synchronization signal of the final output.

The "upper side of the image" shown in FIG. 3 refers to the upper side of the active screen (the portion of the screen corresponding to the image that is actually displayed when an image signal obtained by the imaging apparatus is displayed in a display apparatus (that is, the image excluding portions such as the synchronization signals)), and the first line in the active screen receives light during that period indicated by the arrow in FIG. 3. Because the timing at which light is received shifts slightly with each line in the CMOS image sensor, the 720th line is shifted by approximately 1/240 of a second. Here, in the case where incoming flash light has occurred at the timing indicated by the star in FIG. 3, that flashing light will be received in the lines that compose the lower side of the screen in the frame (2) and the lines that compose the upper side of the screen in the frame (3). When, in such a state, the image signal obtained by the imaging unit 1 is displayed in a display apparatus, a horizontal band of high luminance will appear across the two sequential frames in the displayed screen (video).

However, in the imaging apparatus 100 according to the present embodiment, the image signals of the frames in which incoming flash light has been detected, or in other words, the frames (2) and (3) (the image signals that form the frames (2) and (3)), are not employed; instead, an image signal generated from the average values of the frames in which incoming flash light was not detected, or in other words, the frames (1) and (4) in FIG. 3, is outputted from the average computation unit 3. Then, because the latter-stage processing is then executed on the image signal outputted from the average computation unit 3, the image signal outputted from the image processing unit 5, which is the final output, can prevent the appearance of horizontal bands of high luminance in the displayed screen when displayed in a display apparatus.

Figure 4:
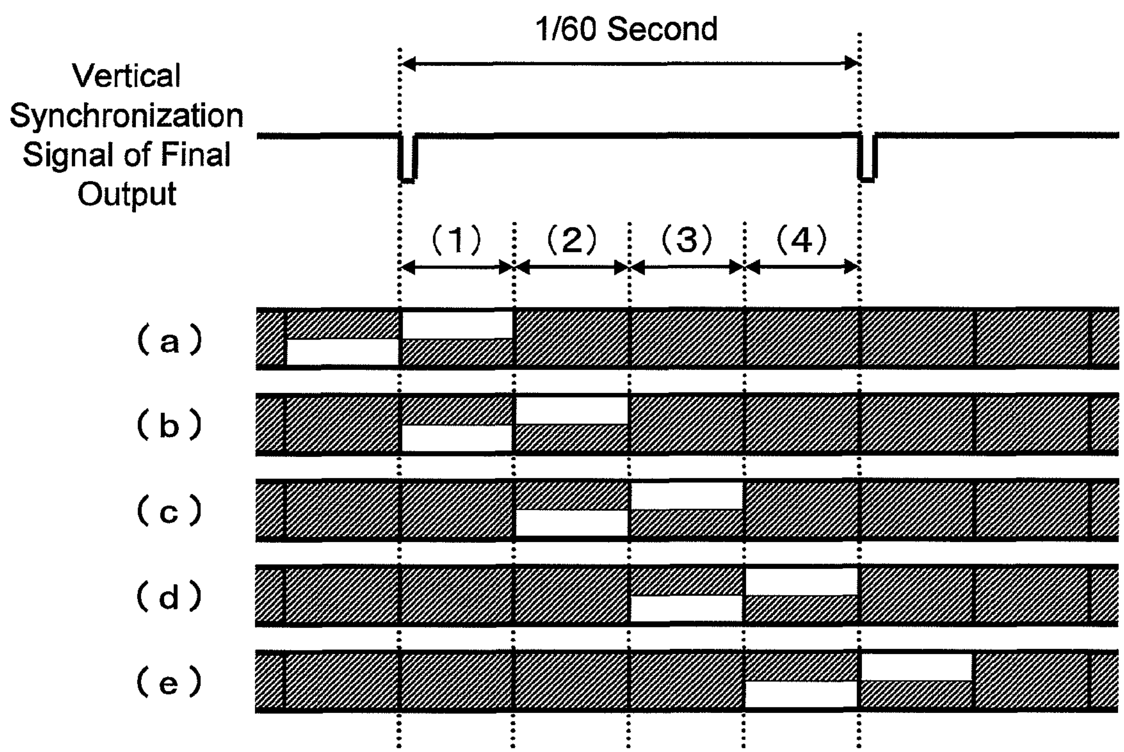
FIG. 4 is a diagram illustrating the timing at which a horizontal band of high luminance appears, due to incoming flash light, in an image outputted by an imaging unit in the imaging apparatus 100 according to the first embodiment.

Furthermore, additional descriptions regarding the processing of the average computation unit 3 shall be given using FIG. 4.

FIG. 4 is a diagram illustrating the timing at which a horizontal band of high luminance appears due to incoming flash light in an image formed by the image signal outputted from the imaging unit 1, in the imaging apparatus 100 according to the first embodiment. In FIGS. 4, (1) to (4) indicate four continuous frames at a frame frequency of 240 Hz (four frames at 240p), and frames filled with a hatch pattern indicate frames in which there is no incoming flash light. Frames in which there is incoming flash light are white in their upper half or lower half.

In the case where there has been a single flash of incoming flash light, five types of phase relationships, or (a) to (e), are possible with respect to the timing of a 1/60 second vertical synchronization signal, as shown in FIG. 4. With the imaging apparatus 100 according to the present embodiment, the frames to be removed are determined in the following manner, and the average value processing is then performed by the average computation unit 3.

(A) In the case of the phase relationship (a), the frame (1) is removed, and the average value of the frames (2) to (4) is calculated.

(B) In the case of the phase relationship (b), the frames (1) and (2) are removed, and the average value of the frames (3) and (4) is calculated.

(C) In the case of the phase relationship (c), the frames (2) and (3) are removed, and the average value of the frames (1) and (4) is calculated.

(D) In the case of the phase relationship (d), the frames (3) and (4) are removed, and the average value of the frames (1) and (2) is calculated.

(E) In the case of the phase relationship (e), the frame (4) is removed, and the average value of the frames (1) to (3) is calculated.

In this manner, with the imaging apparatus 100, average computations are possible for all phase relationships through the calculations performed by the average computation unit 3.

As described thus far, with the imaging apparatus 100 according to the present embodiment, the imaging unit 1, which is driven at 4× speed, and the average computation unit 3, which removes frame images in which incoming flash light has been detected, calculates an average value, and outputs an image signal, are provided. As a result, with the imaging apparatus 100, the appearance of horizontal bands of high luminance can be prevented in an image signal with a frame frequency of 60 Hz, which is the final output; furthermore, because the same frame image is not outputted continuously multiple times, the continuity of the image as a moving picture can be maintained when an image signal obtained by the imaging apparatus 100 is displayed in a display apparatus.

<<Modified Example>>

Figure 5:
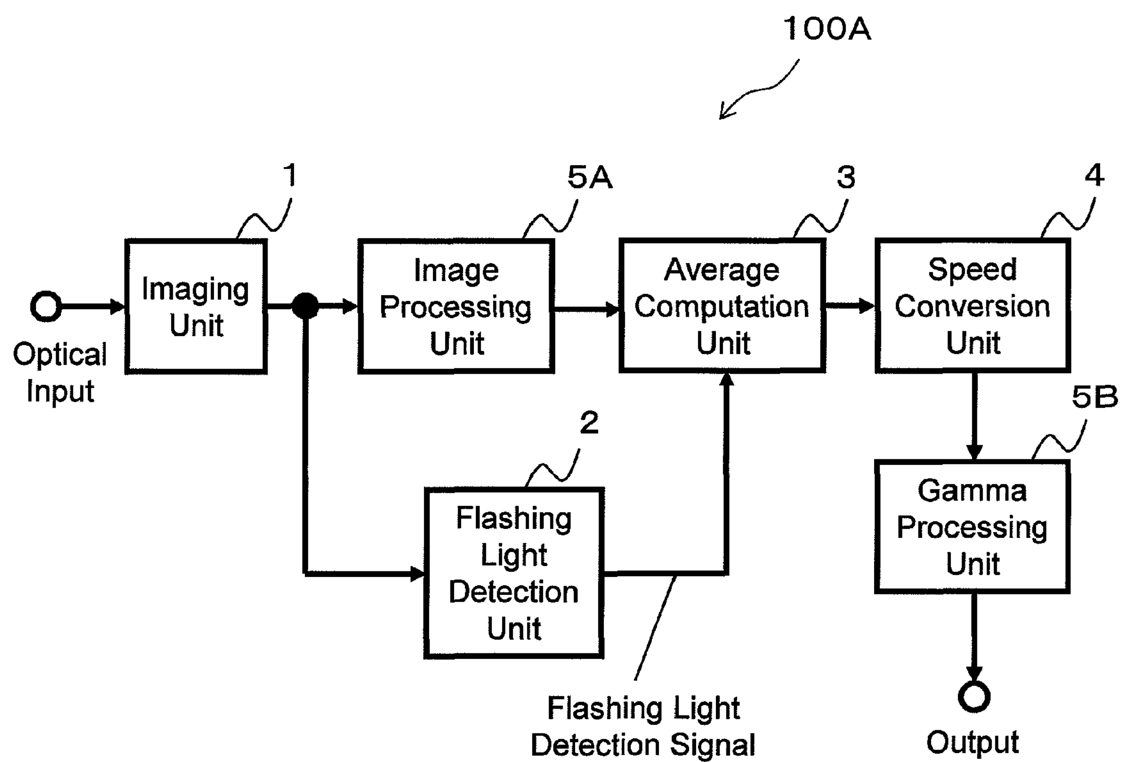
FIG. 5 is a block diagram of an imaging apparatus 100A according to a modified example on the first embodiment.

Although the present embodiment describes a case in which the image processing unit 5 performs gamma processing, contour emphasis processing, and the like on an image signal with a frame frequency of 60 Hz generated by the speed conversion unit 4, it should be noted that the technique is not limited thereto; for example, the image processing may be split up into two processes, as with the imaging apparatus 100A shown in FIG. 5.

FIG. 5 is a block diagram of an imaging apparatus 100A according to a modified example on the first embodiment.

As shown in FIG. 5, the imaging apparatus 100A is provided with an image processing unit 5A and a gamma processing unit 5B instead of the image processing unit 5 of the imaging apparatus 100; the image processing unit 5A is disposed in between the imaging unit 1 and the average computation unit 3, and the gamma processing unit 5B is disposed in the stage following the speed conversion unit 4. Aside from this, the imaging apparatus 100A is identical to the imaging apparatus 100. Elements in the imaging apparatus 100A that are identical to those in the imaging apparatus 100 are provided with the same reference numerals, and descriptions thereof are omitted.

Although in the imaging apparatus 100A shown in FIG. 5, the image processing is split up into two blocks that are performed separately, the operations for removing frames of incoming flash light and calculating the average value of images (frame images) are the same as those performed by the imaging apparatus 100. Therefore, the imaging apparatus 100A can achieve the same effects as the imaging apparatus 100.

Although in the present embodiment, the average computation unit 3 performs the average computation process using all of the frames that do not contain flashing light when flashing light has been detected, it should be noted that it is not necessary to calculate the average using all of the frames as long as there is at least one frame that does not contain flashing light in the period of 1/60 second (that is, the period corresponding to four frames of 240p).

Second Embodiment

A second embodiment shall be described with reference to the drawings.

<2.1: Configuration of Imaging Apparatus>

The basic configuration of the imaging apparatus according to the second embodiment is the same as that of the imaging apparatus 100 according to the first embodiment, and therefore detailed descriptions of the configuration of the imaging apparatus of the present embodiment shall be omitted. The differences between the present embodiment and the first embodiment are as described hereinafter.

First, with the imaging apparatus of the present embodiment, n=6, and in the imaging unit, the CMOS image sensor is driven at 6× speed, and a digital sequential scan image signal with a frame frequency of 360 Hz (60 Hz×6) is obtained and outputted. This point is different from the first embodiment.

Second, with the imaging apparatus of the present embodiment, the average computation unit is capable of using an image signal corresponding to a maximum of six frames' worth (six frames at 360p) of images (frame images) and performing the average value calculation. This point is different from the first embodiment.

Third, with the imaging apparatus of the present embodiment, the speed conversion unit converts an image signal with a frame frequency of 360 Hz to an image signal with a frame frequency of 60 Hz (performs frame rate conversion from 360p to 60p). This point is different from the first embodiment.

Points of the present embodiment aside from those described above are the same as in the first embodiment.

<2.2: Operation of Imaging Apparatus>

Operations of the imaging apparatus according to the second embodiment configured as described above shall be described hereinafter. With respect to the operations of the imaging apparatus according to the second embodiment, portions that differ from the first embodiment shall be described. To be more specific, an average calculation process executed by the average computation unit using six continuous frames (six frames at 360p) of an image signal outputted from the imaging unit (an image signal with a frame frequency of 360 Hz) of the imaging apparatus according to the present embodiment shall be described using FIG. 6.

Figure 6:
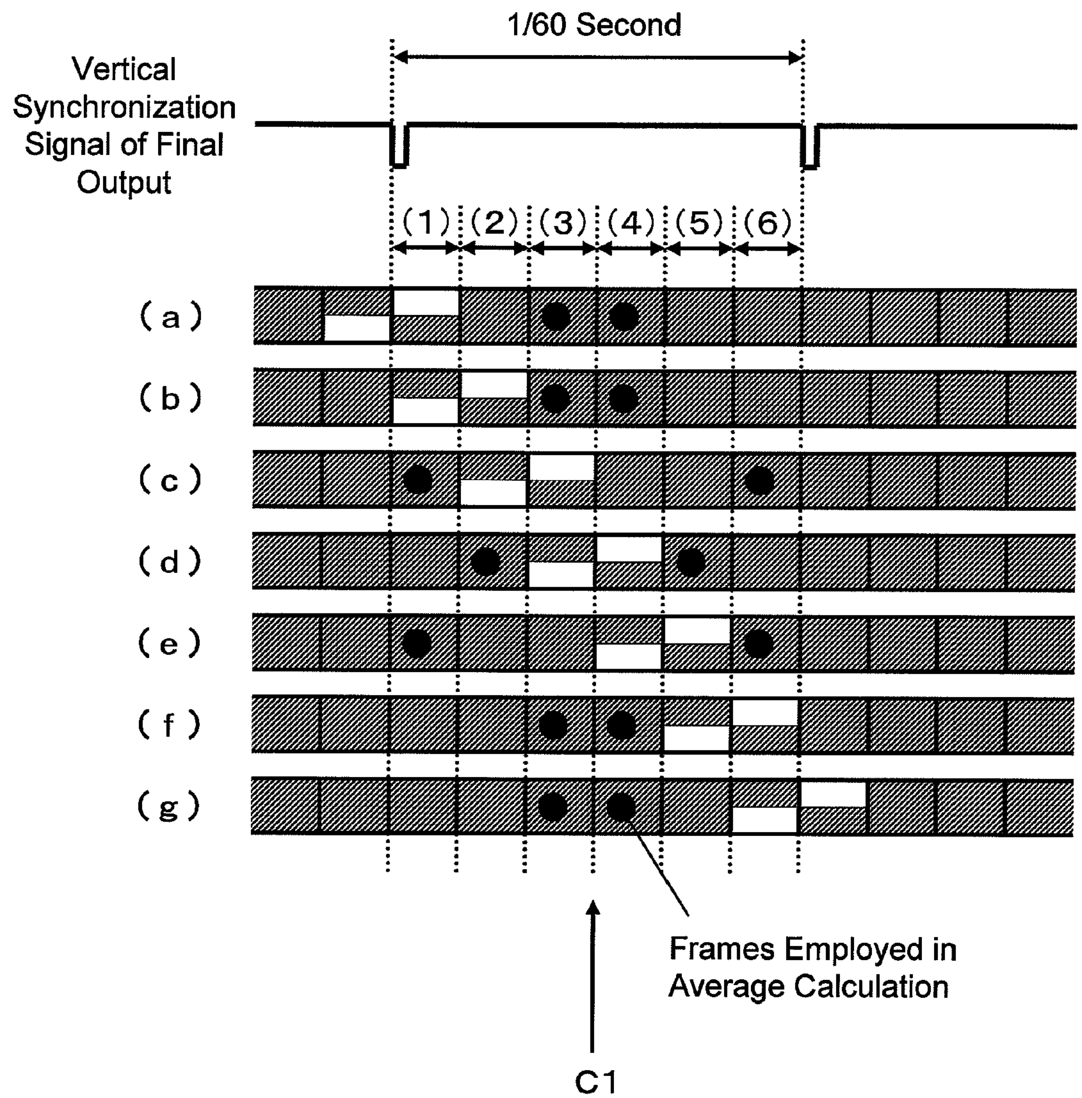
FIG. 6 is a diagram illustrating the timing at which a horizontal band of high luminance appears, due to incoming flash light, in an image outputted by an imaging unit in an imaging apparatus according to a second embodiment.

FIG. 6 is a diagram illustrating the timing at which a horizontal band of high luminance appears due to incoming flash light in an image signal outputted from the imaging unit, in the imaging apparatus according to the present embodiment. (1) to (6) in FIG. 6 indicate six continuous frames at a frame frequency of 360 Hz (six frames at 360p), based on the vertical synchronization signal of the final output. In FIG. 6, frames filled with a hatch pattern indicate frames in which there is no incoming flash light. Frames in which there is incoming flash light are white in their upper half or lower half.

In the case where there has been a single flash of incoming flash light, seven types of phase relationships, or (a) to (g), are possible with respect to the timing of a 1/60 second vertical synchronization signal, as shown in FIG. 6. With the imaging apparatus according to the present embodiment, the frames to be removed are determined in the following manner, and the averaging processing is then performed by the average computation unit.

(A) In the case of the phase relationship (a), the frames (1), (2), (5), and (6) are removed, and the average value of the frames (3) and (4), indicated in FIG. 6 by black circles, is calculated.

(B) In the case of the phase relationship (b), the frames (1), (2), (5), and (6) are removed, and the average value of the frames (3) and (4), indicated in FIG. 6 by black circles, is calculated.

(C) In the case of the phase relationship (c), the frames (2), (3), (4), and (5) are removed, and the average value of the frames (1) and (6), indicated in FIG. 6 by black circles, is calculated.

(D) In the case of the phase relationship (d), the frames (1), (3), (4), and (6) are removed, and the average value of the frames (2) and (5), indicated in FIG. 6 by black circles, is calculated.

(E) In the case of the phase relationship (e), the frames (2), (3), (4), and (5) are removed, and the average value of the frames (1) and (6), indicated in FIG. 6 by black circles, is calculated.

(F) In the case of the phase relationship (f), the frames (1), (2), (5), and (6) are removed, and the average value of the frames (3) and (4), indicated in FIG. 6 by black circles, is calculated.

(G) In the case of the phase relationship (g), the frames (1), (2), (5), and (6) are removed, and the average value of the frames (3) and (4), indicated in FIG. 6 by black circles, is calculated.

In this manner, with the imaging apparatus of the present embodiment, average computations are possible for all phase relationships through the calculations performed by the average computation unit.

With the imaging apparatus according to the present embodiment, frame numbers from 1 to n are added to n continuous frames of an n time-speed image (image signal) outputted from the imaging unit, and frames in which flashing light has not been detected are selected and the average thereof calculated by the average computation unit so that the average of the frame numbers is (n+1)/2. In the present embodiment, n=6.

With the imaging apparatus according to the present embodiment, the frames to be averaged are selected so that the average of the frame numbers is calculated as (n+1)/2. By performing control in this manner, the imaging apparatus can take the frames from (1) to (6) that correspond to each other on the right and left in FIG. 6 as the frames to be employed in average calculation, and can ensure that the temporal center is always at the center of 1/60 of a second (in the case of FIG. 6, the temporal center can be always located at the position indicated by C1).

If, for example, incoming flash light has been detected at the time (b) in FIG. 6, frames (1) and (2) are removed and the average calculation is performed using the four frames from frames (3) to (6), and the resultant is converted into an image with a frame frequency of 60 Hz, that image will be temporally delayed, appearing as a single image within the video. For example, when an object moving at the same speed has been imaged, the object will not move at uniform intervals in the image outputted by the imaging apparatus, and will be displayed more towards a later frame. However, in the image (video) obtained by the imaging apparatus of the present embodiment, the temporal center is always constant, regardless of the presence/absence of incoming flash light. For this reason, the image (video) obtained by the imaging apparatus according to the present embodiment moves smoothly as a moving picture.

As described thus far, the imaging apparatus of the present embodiment has an imaging unit, which is driven at 6× speed, and an average computation unit, which calculates the average of the frames indicated by black circles in FIG. 6, and operates as described thus far; therefore, the appearance of horizontal bands of high luminance in an image signal with a frame frequency of 60 Hz, which is the final output, can be prevented, and the same frame image is not continuously outputted multiple times. For this reason, the image (video) obtained by the imaging apparatus according to the present embodiment can maintain continuity as a moving picture. Furthermore, the frames from (1) to (6) that correspond to each other on the right and left in FIG. 6 can be taken as the frames to be employed in average calculation, ensuring that the temporal center is always constant; therefore the image (video) obtained by the imaging apparatus of the present embodiment moves smoothly as a moving picture.

Third Embodiment

A third embodiment shall be described with reference to the drawings.

<3.1: Configuration of Imaging Apparatus>

The basic configuration of the imaging apparatus according to the third embodiment is the same as that of the imaging apparatus 100 according to the first embodiment, and therefore detailed descriptions of the configuration of the imaging apparatus of the present embodiment shall be omitted. The differences between the present embodiment and the first embodiment are as described hereinafter.

First, with the imaging apparatus of the present embodiment, n=8, and in the imaging unit, the CMOS image sensor is driven at 8× speed, and a digital sequential scan image signal with a frame frequency of 480 Hz (60 Hz×8) is obtained and outputted. This point is different from the first embodiment.

Second, with the imaging apparatus of the present embodiment, the average computation unit is capable of using an image signal corresponding to a maximum of eight frames' worth (eight frames at 480p) of images (frame images) and performing the average value calculation. This point is different from the first embodiment.

Third, with the imaging apparatus of the present embodiment, the speed conversion unit converts an image signal with a frame frequency of 480 Hz to an image signal with a frame frequency of 60 Hz (performs frame rate conversion from 480p to 60p). This point is different from the first embodiment.

Points of the present embodiment aside from those described above are the same as in the first embodiment.

<3.2: Operation of Imaging Apparatus>

Operations of the imaging apparatus according to the third embodiment configured as described above shall be described hereinafter. With respect to the operations of the imaging apparatus according to the third embodiment, portions that differ from the first embodiment shall be described. To be more specific, an average calculation process executed by the average computation unit using eight continuous frames (eight frames at 480p) of an image signal outputted from the imaging unit (an image signal with a frame frequency of 480 Hz) of the imaging apparatus according to the present embodiment shall be described using FIG. 7.

Figure 7:
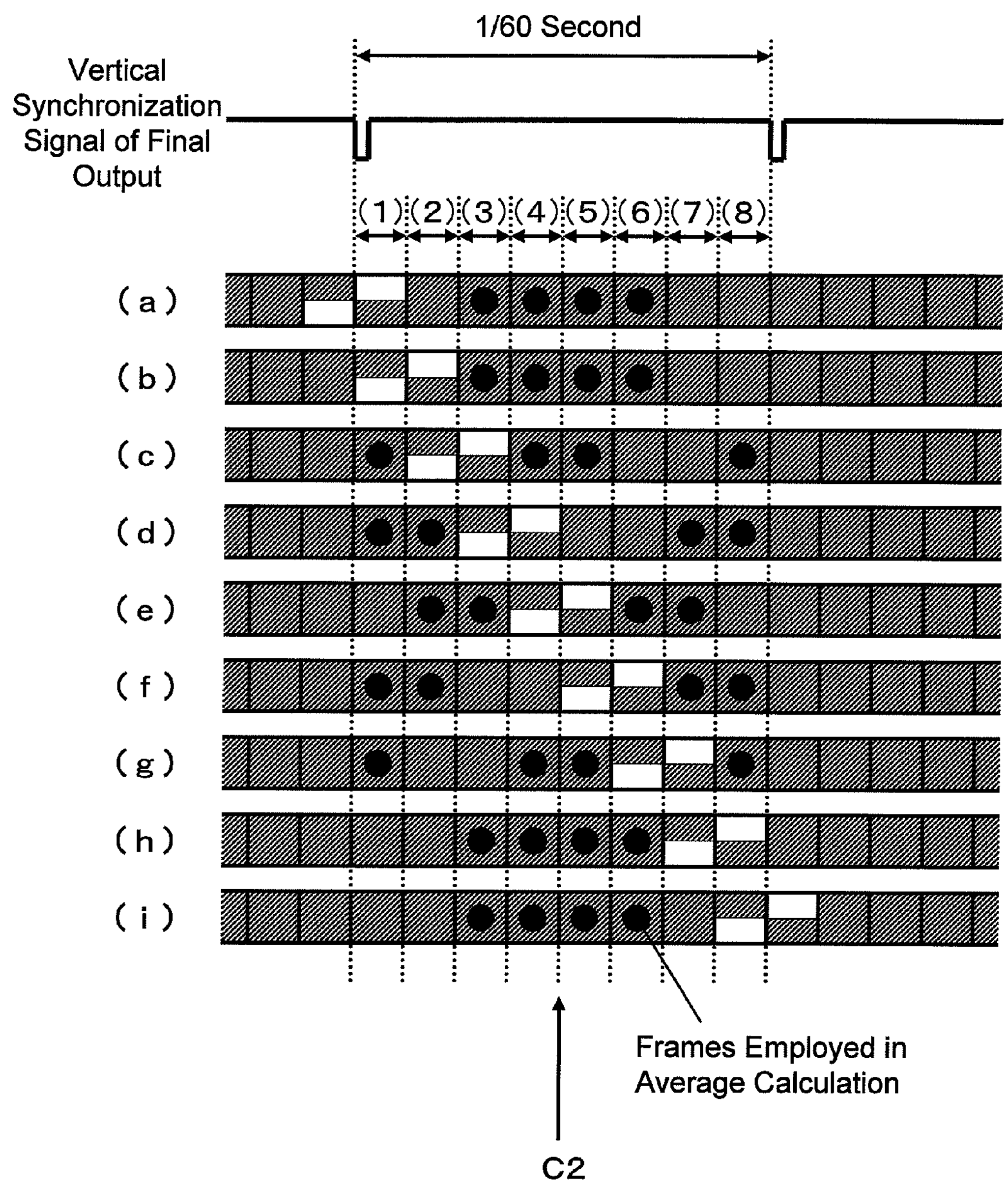
FIG. 7 is a diagram illustrating the timing at which a horizontal band of high luminance appears, due to incoming flash light, in an image outputted by an imaging unit in an imaging apparatus according to a third embodiment.

FIG. 7 is a diagram illustrating the timing at which a horizontal band of high luminance appears due to incoming flash light in an image signal outputted from the imaging unit, in the imaging apparatus according to the present embodiment. (1) to (8) in FIG. 7 indicate eight continuous frames at a frame frequency of 480 Hz (eight frames at 480p), based on the vertical synchronization signal of the final output. In FIG. 7, frames filled with a hatch pattern indicate frames in which there is no incoming flash light. Frames in which there is incoming flash light are white in their upper half or lower half.

In the case where there has been a single flash of incoming flash light, nine types of phase relationships, or (a) to (i), are possible with respect to the timing of a 1/60 second vertical synchronization signal, as shown in FIG. 7. With the imaging apparatus according to the present embodiment, the frames to be removed are determined in the following manner, and the average value processing is then performed by the average computation unit.

(A) In the case of the phase relationship (a), the frames (1), (2), (7), and (8) are removed, and the average value of the frames (3), (4), (5), and (6), indicated in FIG. 7 by black circles, is calculated.

(B) In the case of the phase relationship (b), the frames (1), (2), (7), and (8) are removed, and the average value of the frames (3), (4), (5), and (6), indicated in FIG. 7 by black circles, is calculated.

(C) In the case of the phase relationship (c), the frames (2), (3), (6), and (7) are removed, and the average value of the frames (1), (4), (5), and (8), indicated in FIG. 7 by black circles, is calculated.

(D) In the case of the phase relationship (d), the frames (3), (4), (5), and (6) are removed, and the average value of the frames (1), (2), (7), and (8), indicated in FIG. 7 by black circles, is calculated.

(E) In the case of the phase relationship (e), the frames (1), (4), (5), and (8) are removed, and the average value of the frames (2), (3), (6), and (7), indicated in FIG. 7 by black circles, is calculated.

(F) In the case of the phase relationship (f), the frames (3), (4), (5), and (6) are removed, and the average value of the frames (1), (2), (7), and (8), indicated in FIG. 7 by black circles, is calculated.

(G) In the case of the phase relationship (g), the frames (2), (3), (6), and (7) are removed, and the average value of the frames (1), (4), (5), and (8), indicated in FIG. 7 by black circles, is calculated.

(H) In the case of the phase relationship (h), the frames (1), (2), (7), and (8) are removed, and the average value of the frames (3), (4), (5), and (6), indicated in FIG. 7 by black circles, is calculated.

(I) In the case of the phase relationship (i), the frames (1), (2), (7), and (8) are removed, and the average value of the frames (3), (4), (5), and (6), indicated in FIG. 7 by black circles, is calculated.

In this manner, with the imaging apparatus of the present embodiment, average computations are possible for all phase relationships through the calculations performed by the average computation unit.

With the imaging apparatus according to the present embodiment, frame numbers from 1 to n are added to n continuous frames of an n time-speed image (image signal) outputted from the imaging unit, and frames in which flashing light has not been detected are selected and the average thereof calculated by the average computation unit so that the average of the frame numbers is (n+1)/2. In the present embodiment, n=8.

With the imaging apparatus according to the present embodiment, the frames to be averaged are selected so that the average of the frame numbers is calculated as (n+1)/2. By performing control in this manner, the imaging apparatus can take the frames from (1) to (8) that correspond to each other on the right and left in FIG. 7 as the frames to be employed in average calculation, and can ensure that the temporal center is always at the center of 1/60 of a second (in the case of FIG. 7, the temporal center can be always located at the position indicated by C2).

As described thus far, the imaging apparatus of the present embodiment has an imaging unit, which is driven at 8× speed, and an average computation unit, which calculates the average of the frames indicated by black circles in FIG. 7, and operates as described thus far; therefore, the appearance of horizontal bands of high luminance in an image signal with a frame frequency of 60 Hz, which is the final output, can be prevented, and the same frame image is not continuously outputted multiple times. For this reason, the image (video) obtained by the imaging apparatus according to the present embodiment can maintain the continuity as a moving picture. Furthermore, the frames from (1) to (8) that correspond to each other on the right and left in FIG. 7 can be taken as the frames to be employed in average calculation, ensuring that the temporal center is always constant; therefore the image (video) obtained by the imaging apparatus of the present embodiment moves smoothly as a moving picture.

Fourth Embodiment

<4.1: Configuration of Imaging Apparatus>

Figure 9:
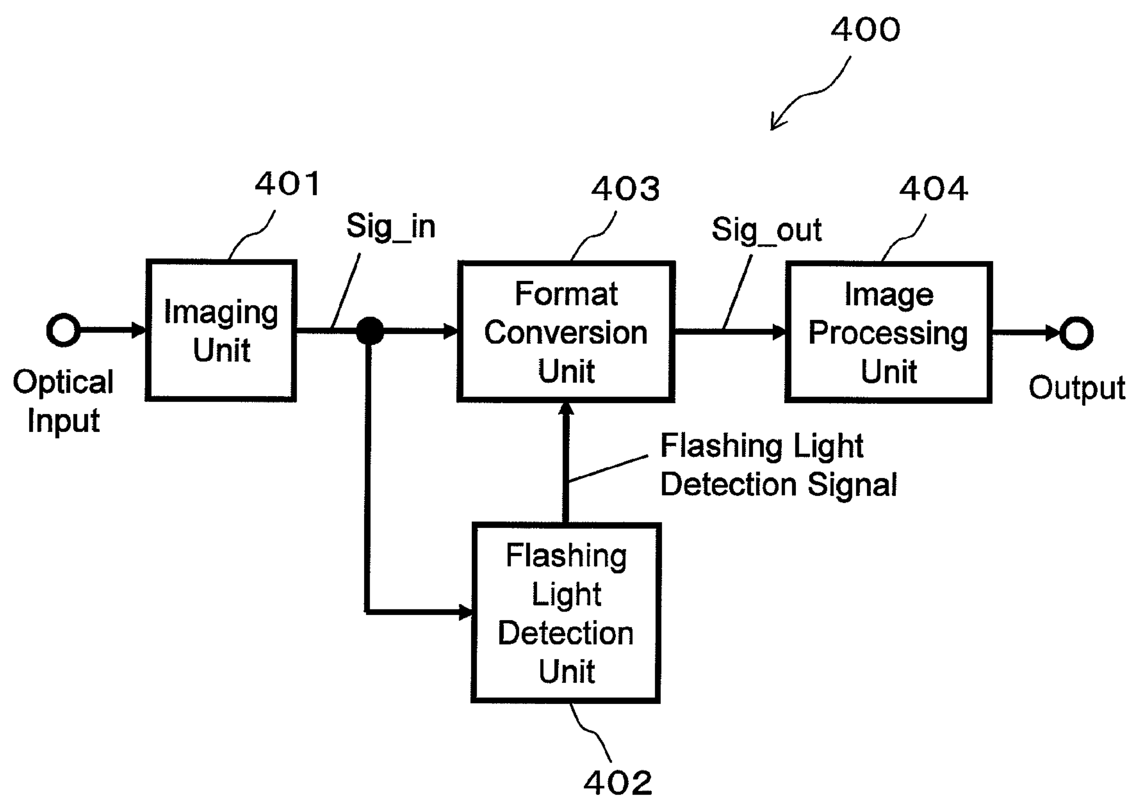
FIG. 9 is a block diagram of an imaging apparatus 400 according to the fourth embodiment.

FIG. 9 is a block diagram of an imaging apparatus 400 according to a fourth embodiment.

As shown in FIG. 9, the imaging apparatus 400 includes an imaging unit 401 that converts light from a subject into an electrical signal and obtains an image signal having a frame rate n times (where n is an integer greater than or equal to 2) that of a predetermined video format, a flashing light detection unit 402 that detects the presence/absence of incoming flash light from the image signal obtained by the imaging unit 401 and outputs the results of the detection as a flashing light detection signal, and a format conversion unit 403 that generates an image signal in which the influence of the flashing light has been eliminated by extracting and adding all or part of the signals of n frames obtained at different times based on the flashing light detection signal. The imaging apparatus 400 also includes an image processing unit 404 that performs gamma processing, contour emphasis processing, and the like on the image signal outputted from the format conversion unit 403.

Note that, for the sake of simplicity, the following descriptions are given assuming that the imaging unit 401 obtains an image signal having a frame rate 4 times that of a predetermined video format (or in other words, that n=4).

The imaging unit 401 has a CMOS image sensor (a CMOS-type image sensor (imaging element)), a sensor driving circuit, and an analog/digital converter; the imaging unit 401 converts light from a subject into an electric signal through photoelectric conversion and outputs that signal as a digital image signal to the flashing light detection unit 402 and the format conversion unit 403. The imaging unit 401 captures a continuous image and outputs a digital sequential scan image signal having, for example, 720 active vertical lines, 1280 active horizontal pixels, and a frame frequency of 240 Hz (that is, 60 Hz×4) (a frame rate of 240 fps (frames per second)). Note that, for the sake of simplicity, the following descriptions are given assuming that the image signal outputted from the imaging unit 401 is a digital sequential scan image signal having 720 active vertical lines, 1280 active horizontal pixels, and a frame frequency of 240 Hz.

The flashing light detection unit 402 is inputted with the image signal outputted from the imaging unit 401 and compares the images in each of sequential frames (the frame images formed by the image signal), detecting the presence/absence of incoming flash light. The flashing light detection unit 402 then outputs a flashing light detection signal, indicating the presence/absence of incoming flash light, to the format conversion unit 403.

The format conversion unit 403 is inputted with the image signal outputted from the imaging unit 401 and the flashing light detection signal outputted from the flashing light detection unit 402. The format conversion unit 403 generates an image signal in a predetermined format by adding, for pixels in the same horizontal/vertical position in the frame images formed by the image signal, the pixel values (corresponding to signal values) in the same pixel positions across multiple frames. It is preferable for the format conversion unit 403 to be provided with K+2 frame memories in the case where the frame rate FRin of the image signal inputted into the format conversion unit 403 is K times the frame rate FRout of the image signal outputted from the format conversion unit 403 (=FRin/FRout). The format conversion unit 403 performs a frame conversion process in, for example, the following manner.

The frame conversion process is performed by extracting K image signals from K+2 image signals stored in the K+2 frame memories, respectively, corresponding to pixels in the same pixel position (coordinate position) in an image region, and adding the extracted K image signals. Note that an averaging process may be performed instead of the adding process.

The format conversion unit 403 then outputs the image signal that has undergone the format conversion process as described above to the image processing unit 404.

Figure 10:
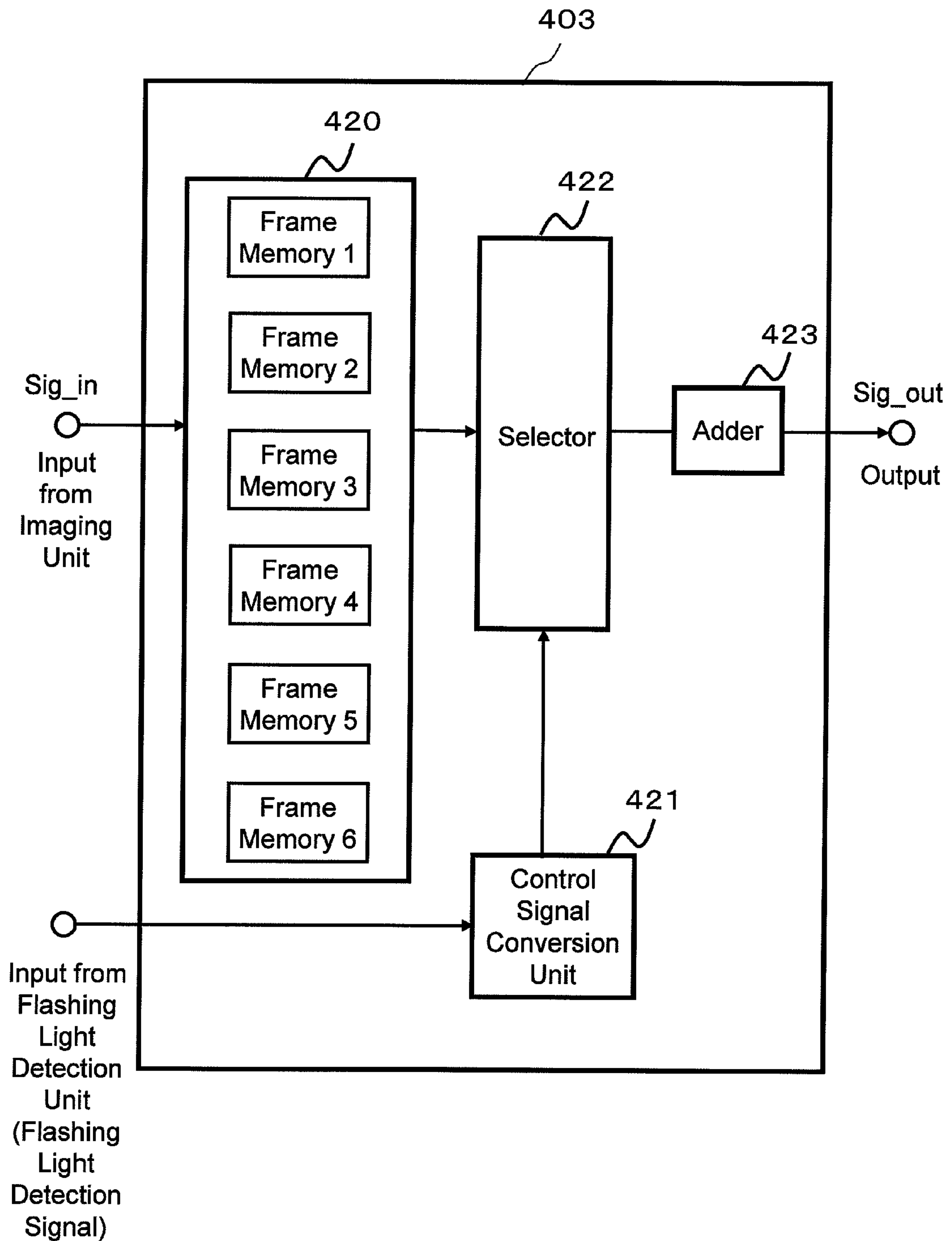
FIG. 10 is a block diagram of a format conversion unit 403 according to the fourth embodiment.

Furthermore, a specific example of the configuration of the format conversion unit 403, for the case where a 240p image signal is converted into a 60p image signal, is illustrated in FIG. 10.

As shown in FIG. 10, the format conversion unit 403 has a frame memory unit 420, a control signal conversion unit 421, a selector 422, and an adder 423.

The frame memory unit 420 is configured of storage elements, such as, for example, memories, that have at least six frames' worth (=240/60+2) of capacity. The frame memory unit 420 stores the image signal with a frame frequency of 240 Hz (a frame rate of 240 fps) outputted from the imaging unit 401 in frame memories 1 through 6, converts that image signal into an image signal with a frame frequency of 60 Hz (a frame rate of 60 fps), and outputs the resulting signal.

The control signal conversion unit 421 is inputted with the flashing light detection signal outputted from the flashing light detection unit 402 and determines, based on the flashing light detection signal, which portion of the six frames stored in the frame memories 1 to 6 (the six-frame period) is being influenced by incoming flash light; the control signal conversion unit 421 then generates a control signal based on the result of the determination and outputs the generated control signal to the selector 422.

The selector 422 is inputted with the six image signals (image signals corresponding to pixels in the same pixel position in an image region) respectively corresponding to the six frames outputted from the frame memory unit 420 (equivalent to six images) and the control signal outputted from the control signal conversion unit 421, and based on the control signal, selects four image signals from among the aforementioned six image signals (selects image signals corresponding to four frame images from among the image signals corresponding to the six frame images), and outputs those signals to the adder 423 (details thereof shall be given later).

The adder 423 adds the four image signals outputted from the selector 422 (the image signals corresponding to the four frame images), and outputs the resultant to the image processing unit 404. Note that the four image signals (the image signals corresponding to the four frame images) may be averaged, rather than adding the four image signals (the image signals corresponding to the four frame images).

The image processing unit 404 performs signal processing such as gamma processing, contour emphasis processing, and the like on the image signal outputted from the format conversion unit 403.

<4.2: Operation of Imaging Apparatus>

Operations of the imaging apparatus 400 configured as described above shall be described hereinafter.

Figure 16:
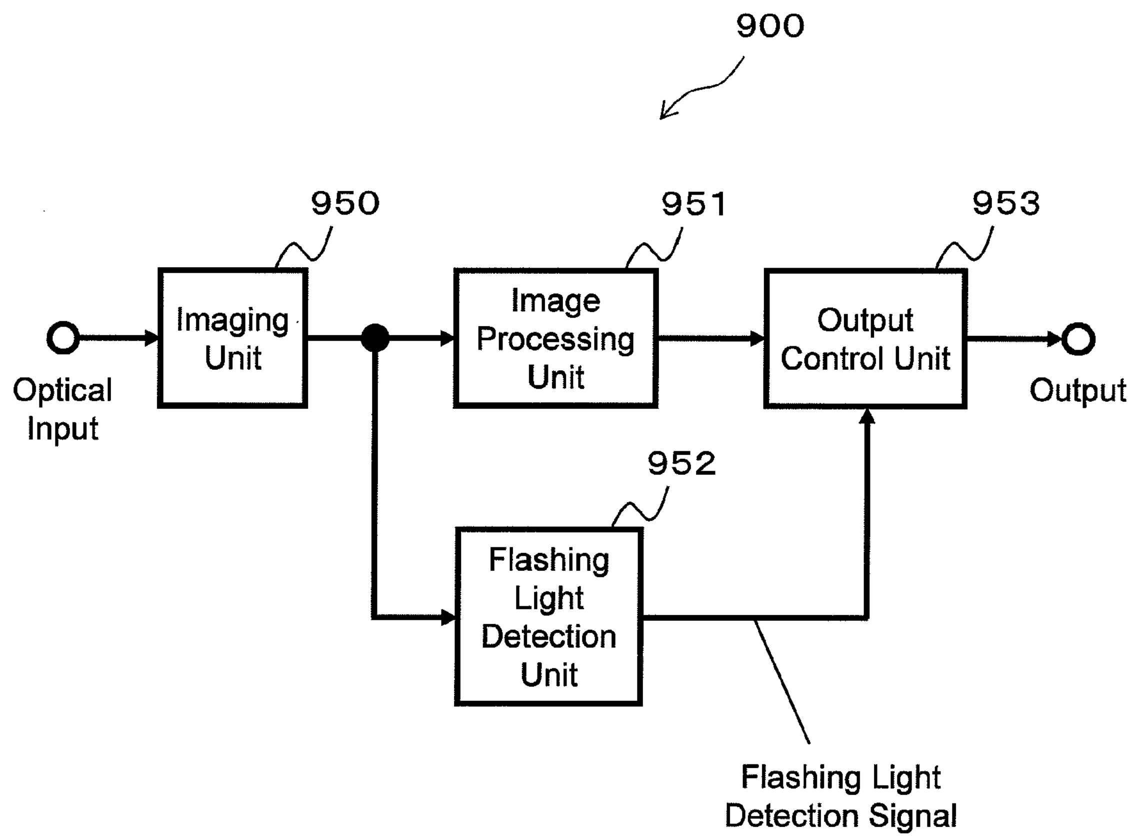
FIG. 16 is a block diagram of a conventional imaging apparatus 900.
Figure 17:
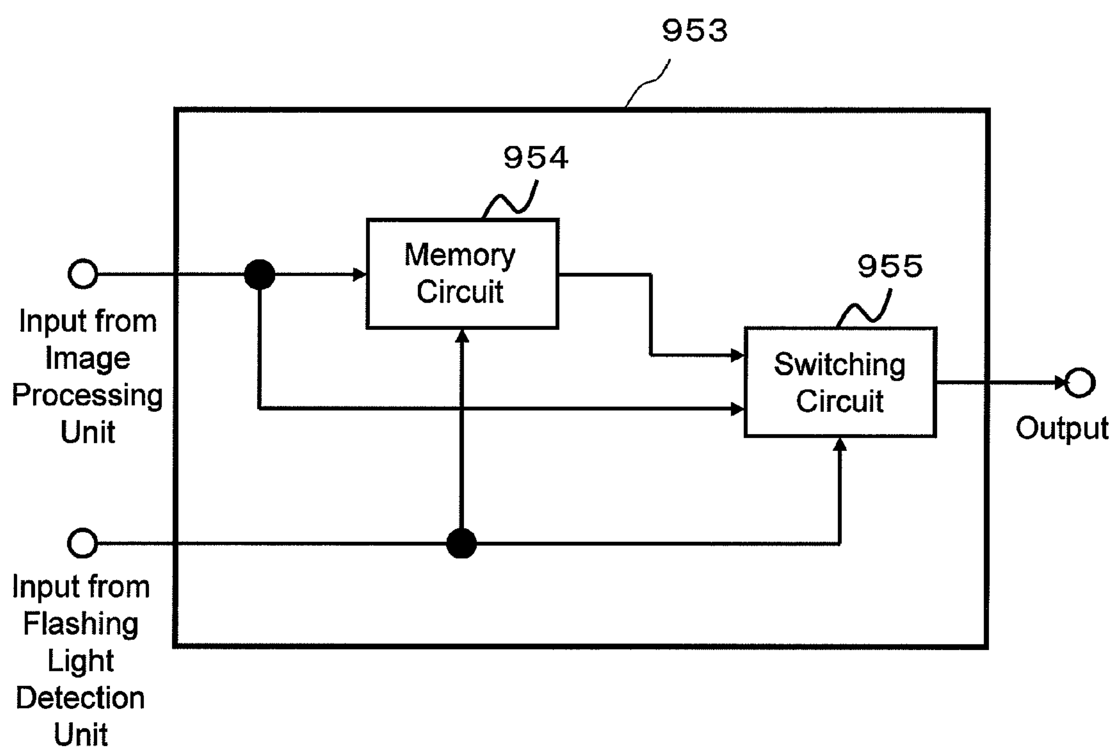
FIG. 17 is a block diagram of an output control unit 953 of the conventional imaging apparatus 900.
Figure 18:
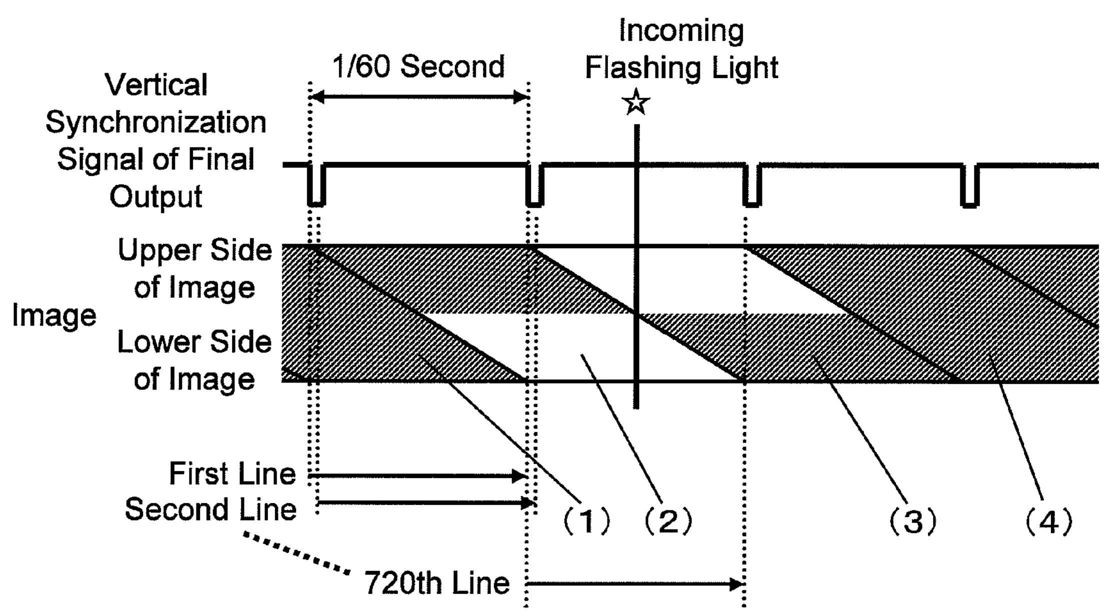
FIG. 18 is a diagram illustrating negative influence on an image caused by incoming flash light in the conventional imaging apparatus 900.

First, in the imaging unit 401, a driving signal is supplied from the sensor driving circuit (not shown), and a digital sequential scan image signal is obtained by performing photoelectric conversion on an optical signal that has entered into the CMOS image sensor and furthermore performing analog/digital conversion on that signal. Note that compared to the imaging unit 950 of the conventional imaging apparatus 900 shown in FIG. 16, the imaging unit 401 drives the CMOS image sensor at 4× speed, and thus outputs a digital sequential scan image signal at a frame frequency of 240 Hz (a frame rate of 240 fps).

The digital sequential scan image signal obtained by the imaging unit 401 is outputted to the flashing light detection unit 402 and the format conversion unit 403.

The flashing light detection unit 402 calculates the average luminance level of one frame's worth of the inputted digital sequential scan image signal (one frame's worth of 240p), and compares the average luminance level of the frames of the inputted signal to the average luminance level of the frame immediately previous thereto (one frame previous); in the case where the average luminance level has increased significantly, the flashing light detection unit 402 determines that the imaging unit 401 obtained the captured image (digital sequential scan image signal) in an environment in which an incoming flash light, such as a flash, was present. For example, in the case where the average luminance level has increased 100% or more, the flashing light detection unit 402 determines that an incoming flash light, such as a flash, has been detected, sets the signal value of the flashing light detection signal to "1", and outputs the flashing light detection signal. On the other hand, in the case where an incoming flash light has not been detected, the flashing light detection unit 402 sets the signal value of the flashing light detection signal to "0" (or uses no signal), and outputs the flashing light detection signal. The flashing light detection signal generated by the flashing light detection unit 402 is then outputted to the format conversion unit 403.

Six frames' worth of the digital sequential scan image signal (image signal) obtained by the imaging unit 401 is inputted into the frame memory unit 420 of the format conversion unit 403 in order.

The frame memory unit 420 writes, into the memory, the image signals corresponding to the six inputted images (six frames' worth of image signals) at a 4× frame rate with a frame frequency of 240 Hz (240 fps) (4 times the frame rate of 60p) and reads out from the memories at the timing of the frame frequency of 60 Hz (a frame rate of 60 fps), thereby performing speed conversion (frame rate conversion) and generating an image signal with a frame frequency of 60 Hz (a frame rate of 60 fps) (a 60p image signal). Note that the timing at which the image signals corresponding to these six images (frame images) (six frames' worth of image signals) are outputted is adjusted so that signals whose positions in the image region of the frame image formed by an image signal are outputted at the same timing.

Meanwhile, the flashing light detection signal outputted from the flashing light detection unit 402 is inputted into the control signal conversion unit 421 of the format conversion unit 403.

The control signal conversion unit 421 generates (sets) a control signal based on which portion of the six frame images (six-frame period) the continuous flashing light detection signal occurs in and outputs that control signal. In other words:

(A) In the case where the flashing light detection signal does not occur at all (the case where the flashing light detection signal does not occur in any of the frame memories 1 to 6), the control signal is set to "0" (a signal value indicating "0" is set for the control signal).

(B) In the case where the flashing light detection signal occurs in the frame memories 1 and 2, the signal value of the control signal is set to "1" (a signal value indicating "1" is set for the control signal).

(C) In the case where the flashing light detection signal occurs in the frame memories 2 and 3, the control signal is set to "2" (a signal value indicating "2" is set for the control signal).

(D) In the case where the flashing light detection signal occurs in the frame memories 3 and 4, the control signal is set to "3" (a signal value indicating "3" is set for the control signal).

(E) In the case where the flashing light detection signal occurs in the frame memories 4 and 5, the control signal is set to "4" (a signal value indicating "4" is set for the control signal).

(F) In the case where the flashing light detection signal occurs in the frame memories 5 and 6, the control signal is set to "5" (a signal value indicating "5" is set for the control signal).

Based on the six types of control signal outputted from the control signal conversion unit 421 indicated in the above (A) through (F), the selector 422 selects and outputs four image signals (four frames' worth of image signals) in the following manner from among the six image signals (six frames' worth of image signals) outputted from the respective frame memories 1 through 6 of the frame memory unit 420. In other words:

(A) In the case of the control signal value of 0:

The image signals outputted from the frame memories 2, 3, 4, and 5, respectively, are selected, and those four selected image signals are outputted to the adder 423.

(B) In the case of the control signal value of 1:

The image signals outputted from the frame memories 1, 2, 3, and 4, respectively, are selected, and those four selected image signals are outputted to the adder 423.

(C) In the case of the control signal value of 2:

The image signals outputted from the frame memories 2, 3, 4, and 5, respectively, are selected, and those four selected image signals are outputted to the adder 423.

(D) In the case of the control signal value of 3:

The image signals outputted from the frame memories 2, 3, 4, and 5, respectively, are selected, and those four selected image signals are outputted to the adder 423.

(E) In the case of the control signal value of 4:

The image signals outputted from the frame memories 2, 3, 4, and 5, respectively, are selected, and those four selected image signals are outputted to the adder 423.

(F) In the case of the control signal value of 5:

The image signals outputted from the frame memories 3, 4, 5, and 6, respectively, are selected, and those four selected image signals are outputted to the adder 423.

The adder 423 adds all of the four image signals outputted from the selector 422 (four image signals that form four different frames and correspond to pixels whose coordinate positions in the image region within the frame are the same) and outputs the resulting signal to the image processing unit 404. Note that the adder 423 may average the four image signals and output the resulting signal to the image processing unit 404.

The image processing unit 404 performs gamma processing (gamma correction), contour emphasis processing, and the like on the image signal outputted from the format conversion unit 403 (a 60p image signal). The image signal processed by the image processing unit 404 is then outputted from the image processing unit 404.

Next, operations performed by the imaging apparatus 400 shall be described in more detail using FIG. 3.

FIG. 3 is a diagram illustrating negative influence on an image caused by incoming flash light in the imaging apparatus 400 according to the present embodiment. (1) to (4) in FIG. 3 indicate the timing in sequential frames at which the CMOS image sensor receives light, based on the vertical synchronization signal of the final output.

The "upper side of the image" shown in FIG. 3 refers to the upper side of the active screen (the portion of the screen corresponding to the image that is actually displayed when an image signal obtained by the imaging apparatus is displayed in a display apparatus (that is, the image excluding portions such as the synchronization signals)), and the first line in the active screen receives light during that period indicated by the arrow in FIG. 3. Because the timing at which light is received shifts slightly with each line in the CMOS image sensor, the 720th line is shifted by approximately 1/240 of a second. Here, in the case where incoming flash light has occurred at the timing indicated by the star in FIG. 3, that flashing light will be received in the lines that compose the lower side of the screen in the frame (2) and the lines that compose the upper side of the screen in the frame (3). When, in such a state, the image signal obtained by the imaging unit 401 is displayed in a display apparatus, a horizontal band of high luminance will appear across the two sequential frames in the displayed screen (video).

However, with the imaging apparatus 400 according to the present embodiment, the final image signal is generated by adding the image signals of the frames in which flashing light was detected, or in other words, the frames (2) and (3) in FIG. 3 (the image signals that form the frames (2) and (3)), and therefore the appearance of horizontal bands of high luminance can be prevented.

(4.2.1: Processing of Format Conversion Unit 403)

Figure 11:
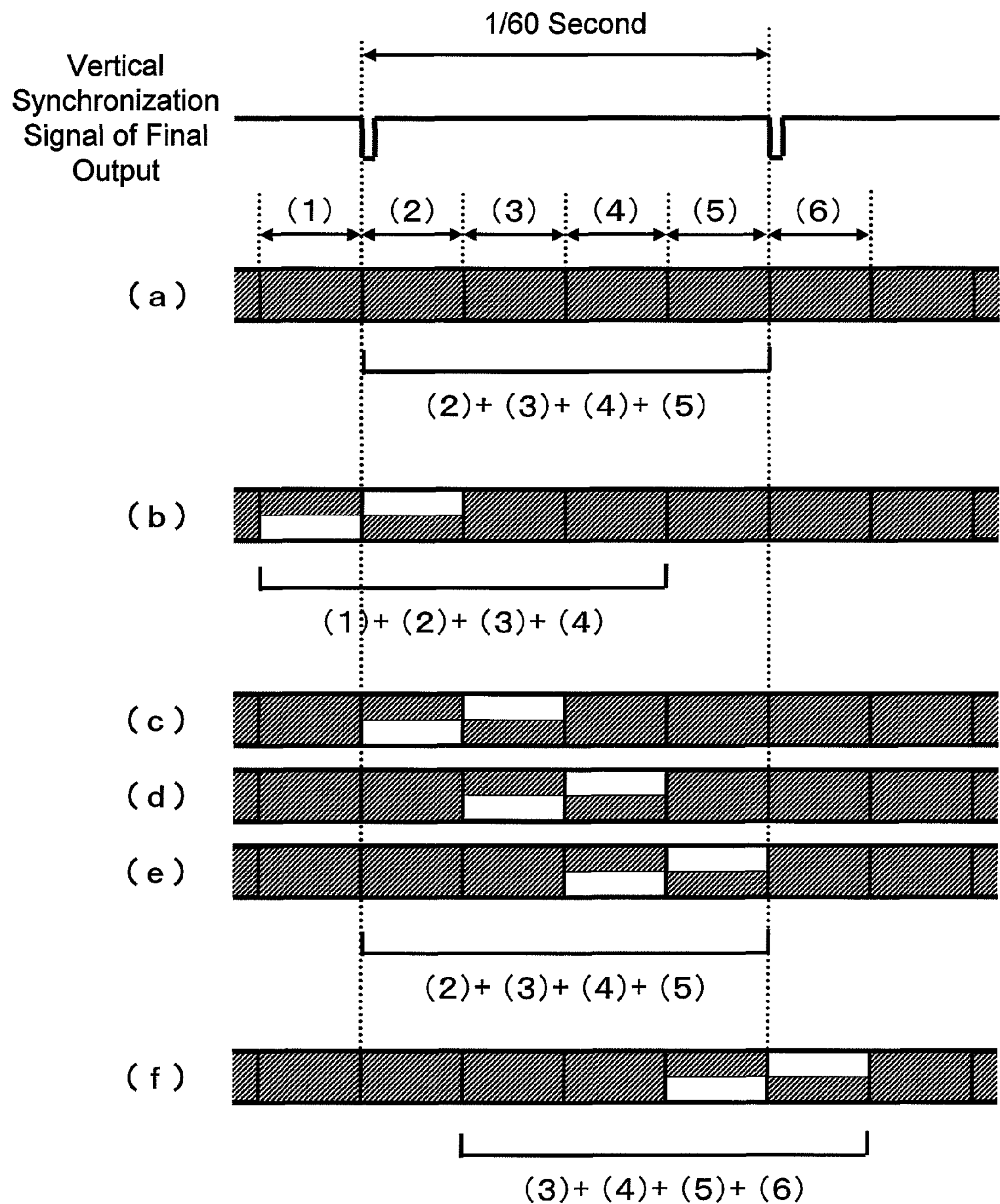
FIG. 11 is a diagram illustrating the timing at which a horizontal band of high luminance appears, due to incoming flash light, in an image outputted by an imaging unit in the imaging apparatus 400 according to the fourth embodiment.

Furthermore, additional descriptions regarding the processing of the format conversion unit 403 shall be given using FIG. 11.

FIG. 11 is a diagram illustrating the timing at which a horizontal band of high luminance appears due to incoming flash light in an image formed by the image signal outputted from the imaging unit 401, in the imaging apparatus 400 according to the present embodiment. In FIGS. 11, (1) to (6) indicate six continuous frames at a frame frequency of 240 Hz (a frame rate of 240 fps) (six frames at 240p) stored in the frame memory unit 420, and frames filled with a hatch pattern indicate frames in which there is no incoming flash light. Frames in which there is incoming flash light are white in their upper half or lower half.

In the case where there has been a single flash of incoming flash light, five types of phase relationships, or (b) to (f), are possible, as shown in FIG. 11. With the imaging apparatus 400 according to the present embodiment, including (a), when there is no incoming flash light, the frames to be added are determined by the format conversion unit 403 and the signals of the determined frames are added in the manner indicated by the following (A) through (F). Note that the frame indicated by (N) in FIG. 11 corresponds to a frame N.

(A) In the case of (a) (when there is no incoming flash light):

The signals of frames 2, 3, 4, and 5 are added.

(B) In the case of the phase relationship (b):

The signals of frames 1, 2, 3, and 4 are added.

(C) In the case of the phase relationship (c):

The signals of frames 2, 3, 4, and 5 are added.

(D) In the case of the phase relationship (d):

The signals of frames 2, 3, 4, and 5 are added.

(E) In the case of the phase relationship (e):

The signals of frames 2, 3, 4, and 5 are added.

(F) In the case of the phase relationship (f):

The signals of frames 3, 4, 5, and 6 are added.

In this manner, with the imaging apparatus 400, two continuous frames that have been influenced by incoming flash light are always added by the format conversion unit 403, and therefore it is possible to eliminate the influence of incoming flash light in all of the phase relationships.

As described thus far, the imaging apparatus 400 according to the present embodiment is provided with the imaging unit 401, which is driven at 4× speed, and the format conversion unit 403, which adds frame images in which incoming flash light has been detected and outputs an image signal, and thus can prevent the appearance of horizontal bands of high luminance in an image signal with a frame frequency of 60 Hz (a frame rate of 60 fps), which is the final output, and does not continuously output the same frame image multiple times. For this reason, in the video formed by the image signal outputted from the imaging apparatus 400, the sense of continuity of the image as a moving picture can be maintained.

<<First Modified Example>>

Next, a first modified example on the present embodiment shall be described using FIGS. 12 to 14.

The first modified example differs from the above embodiment only in terms of the processing content of the format conversion unit 403, and is identical to the above embodiment in all other respects. Note that the case where the frame rate of the image signal is converted from 240p to 60p by the format conversion unit 403 is described in the present modified example as well.

FIGS. 12 to 14 are timing charts illustrating the image signal Sig_in inputted into the format conversion unit 403 and the image signal Sig_out outputted from the format conversion unit 403. Note that the numbers in the squares shown in the upper section of FIGS. 12 to 14 indicate frame numbers. Frames indicated by white squares (that is, with no background color) indicate frames that are being influenced by incoming flash light.

Figure 12A:
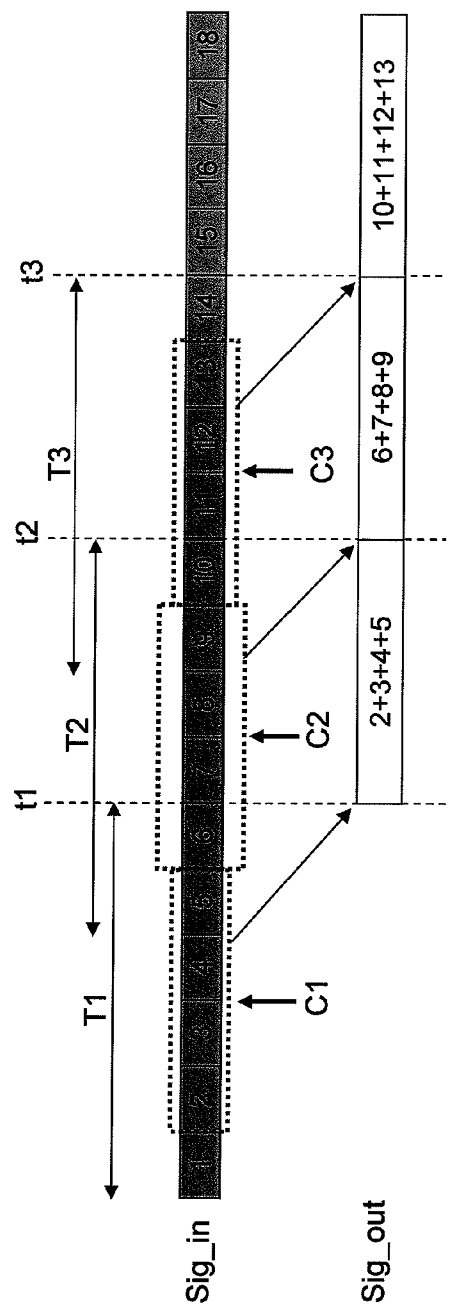
FIG. 12 is a timing chart for an image signal Sig_in that is inputted into the format conversion unit 403 and an image signal Sig_out that is outputted from the format conversion unit 403 according to a first modified example.

In the case of FIG. 12A:

FIG. 12A is a timing chart of the image signals Sig_in and Sig_out in the case where there are no frames in the frames 1 through 18 that are being influenced by incoming flash light.

In this case, as shown in FIG. 12A, the format conversion unit 403 selects, from the input image signal Sig_in in a period T1, the image signals corresponding to four frames, or frames 2 through 5, and adds the image signals corresponding to the four selected frames, or the frames 2 through 5, thereby obtaining an output image signal Sig_out. Note that in FIGS. 12 to 14, the signal obtained by adding the image signals corresponding to, for example, the four frames 2 through 5, is indicated by "2+3+4+5" (other frame numbers are indicated in the same manner).

Similarly, in the case of FIG. 12A, the output image signal Sig_out for the input image signal Sin_in in the period T2 is obtained as a signal of "6+7+8+9", and the output image signal Sig_out for the input image signal Sin_in in the period T3 is obtained as a signal of "10+11+12+13".

In this case, as shown in FIG. 12A, the center in the temporal axis direction of the image signal that has undergone format conversion is not shifted. In other words, in the case of FIG. 12A, the output image signal Sig_out is generated by adding four frames central to C1, C2, and C3 shown in FIG. 12A, and thus the center in the temporal axis direction of the output image signal Sig_out can be thought of as corresponding to C1, C2, and C3. Therefore, in the case of FIG. 12A, the center in the temporal axis direction of the image signal does not shift, and video formed from captured images obtained by the imaging apparatus 400 is natural video.

Figure 12B:
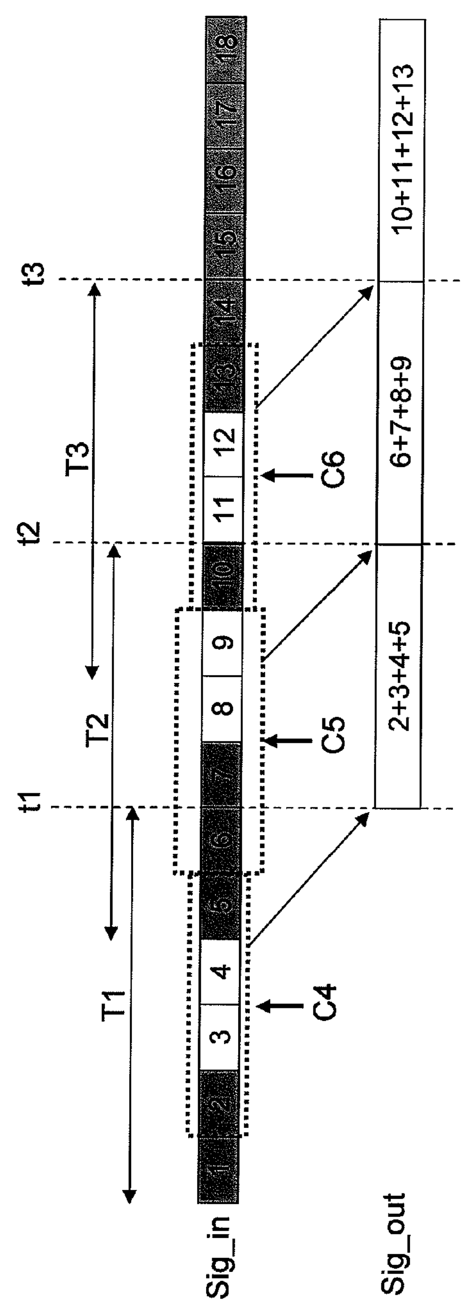

In the case of FIG. 12B:

Next, the case of FIG. 12B shall be described.

FIG. 12B is a timing chart for the case where the frames 3, 4, 8, 9, 11, and 12 are being influenced by incoming flash light.

In the case of FIG. 12B, the four frames selected by the format conversion unit 403 are the same as those in FIG. 12A, and thus the output image signal Sig_out is generated by adding four frames central to C4, C5, and C6 shown in FIG. 12B; therefore, the center in the temporal axis direction of the output image signal Sig_out corresponds to C4, C5, and C6.

Therefore, in the case of FIG. 12B, too, the center in the temporal axis direction of the image signal does not shift, and video formed from captured images obtained by the imaging apparatus 400 is natural video.

Next, the case of FIG. 13 shall be described.

Figure 13A:
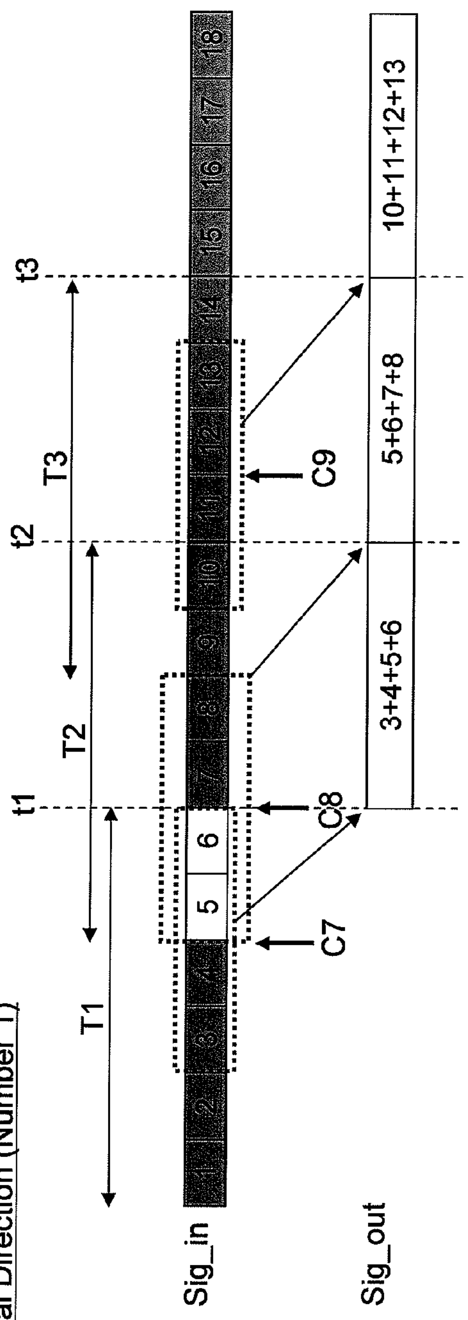
FIG. 13 is a timing chart for the image signal Sig_in that is inputted into the format conversion unit 403 and the image signal Sig_out that is outputted from the format conversion unit 403 according to the first modified example.
Figure 13B:
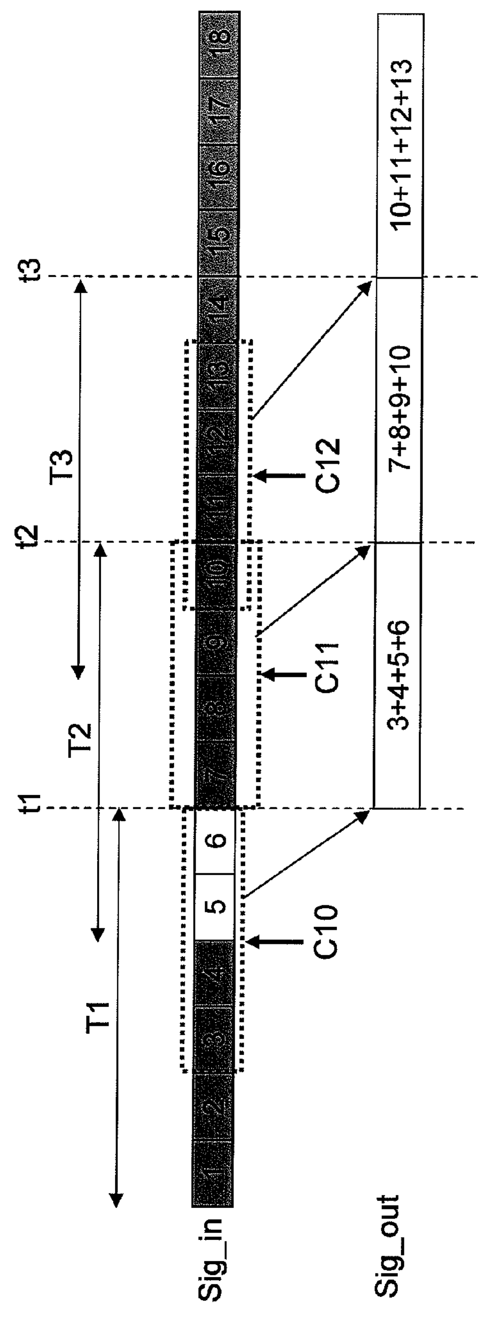

FIGS. 13A and 13B are timing charts for the case where the frames 5 and 6 are being influenced by incoming flash light. Note that FIG. 13A is a timing chart for the aforementioned embodiment, and FIG. 13B is a timing chart for the present modified example.

In the case of FIG. 13A (processing according to the aforementioned embodiment):

In the case of FIG. 13A, the period T1 is the phase relationship (f) in FIG. 11 (equivalent to the case of (F) described in the above embodiment), and therefore the format conversion unit 403 selects, from the input image signal Sig_in in the period T1, the image signals corresponding to four frames, or frames 3 through 6, and adds the image signals corresponding to the four selected frames, or the frames 3 through 6, thereby obtaining an output image signal Sig_out ("3+4+5+6").

In the case of FIG. 13A, the period T2 is the phase relationship (b) in FIG. 11 (equivalent to the case of (B) described in the above embodiment), and therefore the format conversion unit 403 selects, from the input image signal Sig_in in the period T2, the image signals corresponding to four frames, or frames 5 through 8, and adds the image signals corresponding to the four selected frames, or the frames 5 through 8, thereby obtaining an output image signal Sig_out ("5+6+7+8").

In the case of FIG. 13A, the period T3 is the phase relationship (a) in FIG. 11 (equivalent to the case of (A) described in the above embodiment), and therefore the format conversion unit 403 selects, from the input image signal Sig_in in the period T3, the image signals corresponding to four frames, or frames 10 through 13, and adds the image signals corresponding to the four selected frames, or the frames 10 through 13, thereby obtaining an output image signal Sig_out ("10+11+12+13").

The center in the temporal axis direction of the image signal Sig_out obtained in this manner is shifted. In other words, in the case of FIG. 13A, the output image signal Sig_out is generated by adding four frames central to C7, C8, and C9 shown in FIG. 13A, and thus the center in the temporal axis direction of the output image signal Sig_out can be thought of as corresponding to C7, C8, and C9, which are not at uniform periods in the temporal axis direction. Therefore, in the case of FIG. 13A, the center in the temporal axis direction of the image signal is shifted. As a result, video formed from captured images obtained by the imaging apparatus 400 may be unnatural video (it is particularly likely for the video to be unnatural in the case of a video that has movement).

In the case of FIG. 13B (processing according to the first modified example):

Accordingly, with the present modified example, the format conversion unit 403 selects four frames as shown in FIG. 13B, thereby reducing the shift of the center and the temporal axis direction of the image signal.

In the case of FIG. 13B, the format conversion unit of the first modified example performs the same processing as in the aforementioned embodiment during the period T1, but performs different processing than the aforementioned embodiment during the period T2. To be more specific, as shown in FIG. 13B, the frames selected in the period T1 are the four frames toward the end in the temporal axis direction (frames 3 through 6), and thus the format conversion unit of the first modified example selects the four frames toward the end in the temporal axis direction (frames 7 through 10) in the period T2 as well in order to suppress a shift in the center in the temporal axis direction.

In other words, the phase relationship of the six-frame period (for example, the period T2 in FIG. 13B) following the six-frame period of the phase relationship (f) in FIG. 11 (for example, the internal T1 in FIG. 13B) is always the phase relationship (b) in FIG. 11. Therefore, the control signal conversion unit 421 of the present modified example monitors the phase relationship pattern, and upon detecting the aforementioned pattern, outputs a control signal to the selector 422 to select the four frames toward the end in the temporal axis direction in the six-frame period following the six-frame period of the phase relationship (f) in FIG. 11 (for example, the period T1 in FIG. 13B).

Through this, in the present modified example, the image signal outputted from the format conversion unit 403 is central to C10, C11, and C12 in the temporal axis direction, as shown in FIG. 13B, and thus an image signal Sig_out in which a shift in the center in the temporal axis direction is suppressed more than the case of FIG. 13A can be obtained.

Next, the case of FIG. 14 shall be described.

Figure 14A:
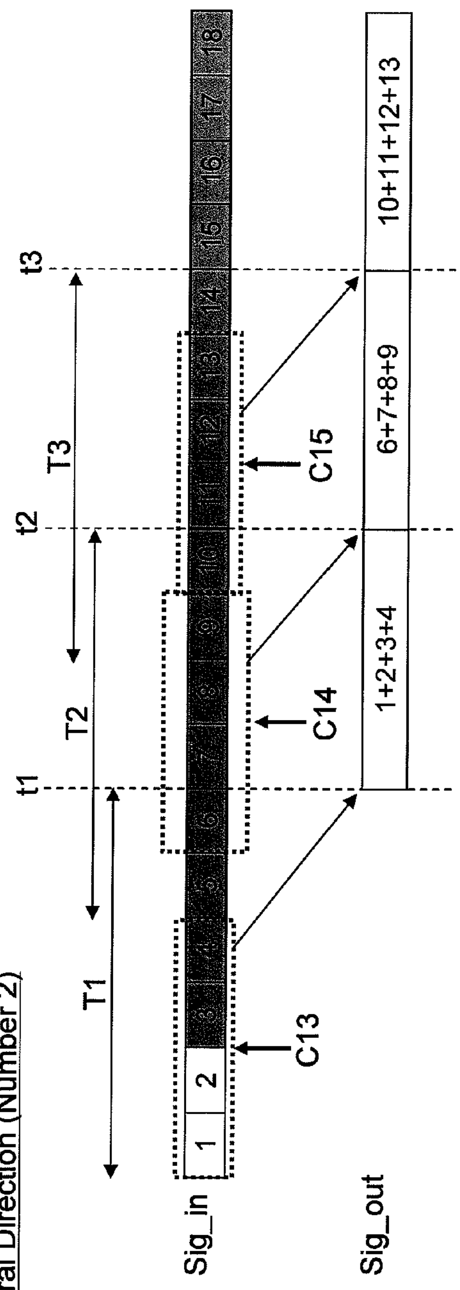
FIG. 14 is a timing chart for the image signal Sig_in that is inputted into the format conversion unit 403 and the image signal Sig_out that is outputted from the format conversion unit 403 according to the first modified example.
Figure 14B:
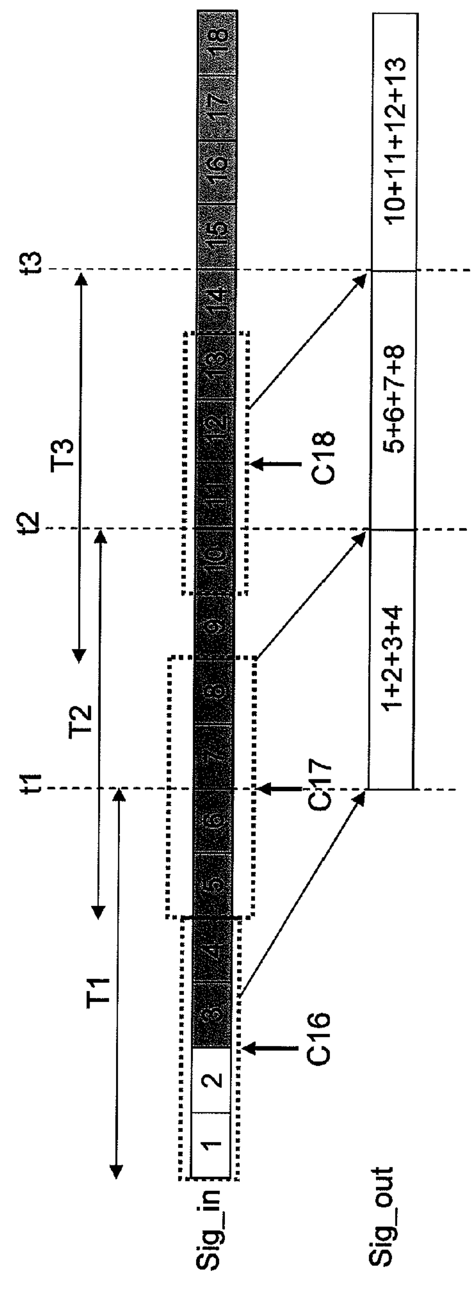

FIGS. 14A and 14B are timing charts for the case where the frames 1 and 2 are being influenced by incoming flash light. Note that FIG. 14A is a timing chart for the aforementioned embodiment, and FIG. 14B is a timing chart for the present modified example.

In the case of FIG. 14A (processing according to the aforementioned embodiment):

In the case of FIG. 14A, the period T1 is the phase relationship (b) in FIG. 11 (equivalent to the case of (B) described in the above embodiment), and therefore the format conversion unit 403 selects, from the input image signal Sig_in in the period T1, the image signals corresponding to four frames, or frames 1 through 4, and adds the image signals corresponding to the four selected frames, or the frames 1 through 4, thereby obtaining an output image signal Sig_out ("1+2+3+4").

In the case of FIG. 14A, the period T2 is the phase relationship (a) in FIG. 11 (equivalent to the case of (A) described in the above embodiment), and therefore the format conversion unit 403 selects, from the input image signal Sig_in in the period T2, the image signals corresponding to four frames, or frames 6 through 9, and adds the image signals corresponding to the four selected frames, or the frames 6 through 9, thereby obtaining an output image signal Sig_out ("6+7+8+9").

In FIG. 14A, the period T3 is the same as the period T2.

The center in the temporal axis direction of the image signal Sig_out obtained in this manner is shifted. In other words, in the case of FIG. 14A, the output image signal Sig_out is generated by adding four frames central to C13, C14, and C15 shown in FIG. 14A, and thus the center in the temporal axis direction of the output image signal Sig_out can be thought of as corresponding to C13, C14, and C15, which are not at uniform periods in the temporal axis direction. Therefore, in the case of FIG. 14A, the center in the temporal axis direction of the image signal is shifted.

In the case of FIG. 14B (processing according to the first modified example):

In the case of FIG. 14B, the format conversion unit of the first modified example performs the same processing as in the aforementioned embodiment during the period T1, but performs different processing than the aforementioned embodiment during the period T2. To be more specific, as shown in FIG. 14B, the frames selected in the period T1 are the four frames toward the start in the temporal axis direction (frames 1 through 4), and thus the format conversion unit of the first modified example selects the four frames toward the start in the temporal axis direction (frames 5 through 8) in the period T2 as well in order to suppress a shift in the center in the temporal axis direction. Note that the control signal for performing this selection is generated by the control signal conversion unit 421 of the present modified example.

As described thus far, in the present modified example, the image signal outputted from the format conversion unit 403 is, as shown in FIG. 14B, centered around C16, C17, and C18 in the temporal axis direction, and thus an image signal Sig_out in which the shift of the center in the region near the frames that have been influenced by incoming flash light (a region in the temporal axis direction) is suppressed more than in the case of FIG. 14A can be obtained.

<<Second Modified Example>>

Next, a second modified example on the present embodiment shall be described using FIG. 15.

The second modified example differs from the above embodiment only in terms of the processing content of the format conversion unit 403, and is identical to the above embodiment in all other respects. Note that the case where the frame rate of the image signal is converted from 240p to 60p by the format conversion unit 403 is described in the present modified example as well.

FIG. 15 is a timing chart illustrating the image signal Sig_in inputted into the format conversion unit 403 and the image signal Sig_out outputted from the format conversion unit 403. Note that the numbers in the squares shown in the upper section of FIG. 15 indicate frame numbers. Frames indicated by white squares (that is, with no background color) indicate frames that are being influenced by incoming flash light.

Figure 15A:
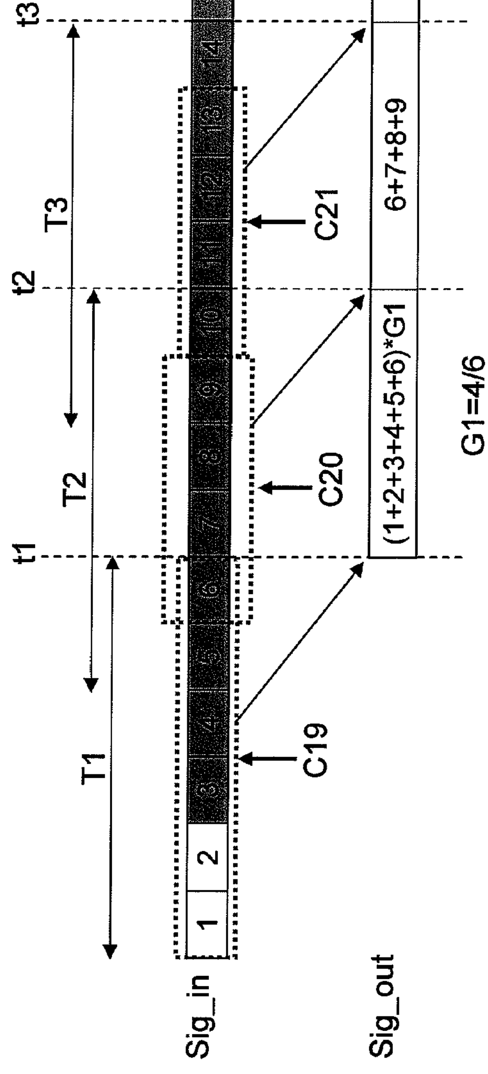
FIG. 15 is a timing chart for the image signal Sig_in that is inputted into the format conversion unit 403 and the image signal Sig_out that is outputted from the format conversion unit 403 according to a second modified example.
Figure 15B:
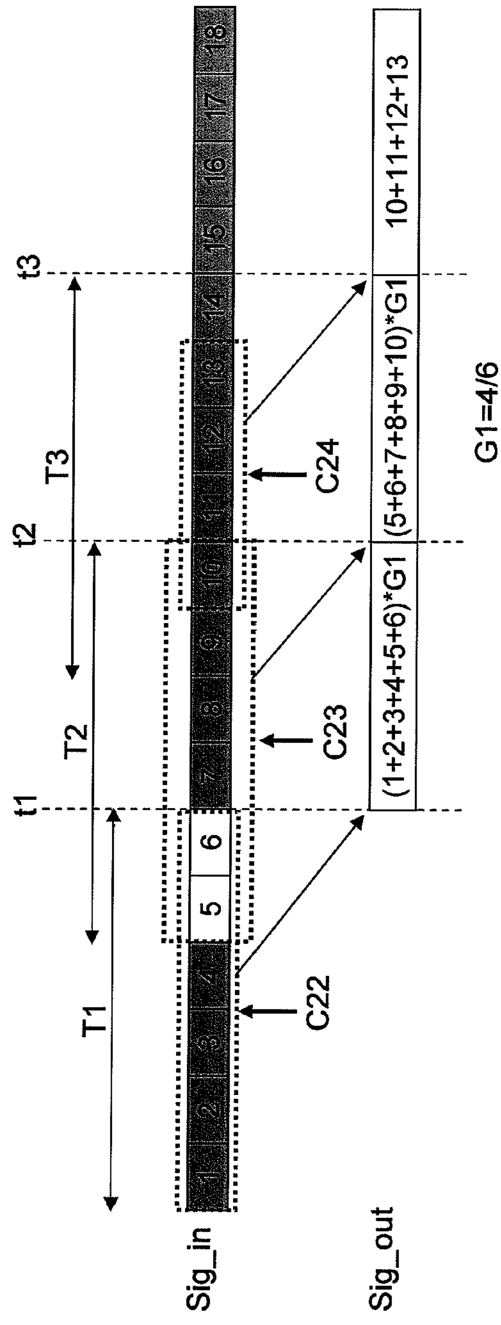

FIG. 15A is a timing chart for the case where the frames 1 and 2 are being influenced by incoming flash light, and FIG. 15B is a timing chart for the case where the frames 5 and 6 are being influenced by incoming flash light.

First, the case of FIG. 15A shall be described.

(Period T1):

In the period T1, the frames 1 and 2 are detected as the frames being influenced by incoming flash light, and thus the format conversion unit 403 of the present modified example selects the image signals corresponding to six frames, or frames 1 through 6, for the inputted image signal Sig_in in period T1, adds the image signals corresponding to the six selected frames, or the frames 1 through 6, and furthermore executes gain processing based on a gain G1 (=4/6), thereby obtaining an output image signal Sig_out ("1+2+3+4+5+6"×G1).

In other words, in the case where frames influenced by incoming flash light have been detected in the K+2 frame period, the format conversion unit 403 of the present modified example adds K+2 image signals stored in the K+2 frame memories, respectively, corresponding to pixels in the same pixel position (coordinate position) in an image region, and performs format conversion processing by multiplying the added image signals by a predetermined gain G1 (=K/(K+2). Note that in the present modified example, K=4.

(Period T2):

In the period T2, no frames being influenced by incoming flash light are detected, and thus the format conversion unit 403 of the present modified example selects the image signals corresponding to four frames, or frames 6 through 9, for the input image signal Sig_in in period T2, and adds the image signals corresponding to the four selected frames, or the frames 6 through 9, thereby obtaining an output image signal Sig_out ("6+7+8+9").

(Period T3):

In the period T3, no frames being influenced by incoming flash light are detected, and thus the format conversion unit 403 of the present modified example selects the image signals corresponding to four frames, or frames 10 through 13, for the input image signal Sig_in in period T3, and adds the image signals corresponding to the four selected frames, or the frames 10 through 13, thereby obtaining an output image signal Sig_out ("10+11+12+13").

Next, the case of FIG. 15B shall be described.

(Period T1):

In the period T1, the frames 5 and 6 are detected as the frames being influenced by incoming flash light, and thus the format conversion unit 403 of the present modified example selects the image signals corresponding to six frames, or frames 1 through 6, for the inputted image signal Sig_in in period T1, adds the image signals corresponding to the six selected frames, or the frames 1 through 6, and furthermore executes gain processing based on a gain G1 (=4/6), thereby obtaining an output image signal Sig_out ("1+2+3+4+5+6"×G1).

(Period T2):

In the period T2, the frames 5 and 6 are detected as the frames being influenced by incoming flash light, and thus the format conversion unit 403 of the present modified example selects the image signals corresponding to six frames, or frames 5 through 10, for the input image signal Sig_in in period T2, adds the image signals corresponding to the six selected frames, or the frames 5 through 10, and furthermore executes gain processing based on a gain G1 (=4/6), thereby obtaining an output image signal Sig_out ("5+6+7+8+9+10"×G1).

(Period T3):

In the period T3, no frames being influenced by incoming flash light are detected, and thus the format conversion unit 403 of the present modified example selects the image signals corresponding to four frames, or frames 10 through 13, for the input image signal Sig_in in period T3, and adds the image signals corresponding to the four selected frames, or the frames 10 through 13, thereby obtaining an output image signal Sig_out ("10+11+12+13").

As described thus far, with the imaging apparatus according to the present modified example, the center in the temporal axis direction of the image signal outputted from the format conversion unit 403 is, in the case of FIG. 15A, C19, C20, and C21, whereas the center in the temporal axis direction of the image signal outputted from the format conversion unit 403 is, in the case of FIG. 15B, C22, C23, and C24; thus, an image signal Sig_out whose center in the temporal axis direction is not shifted can be obtained in both the cases of FIGS. 15A and 15B.

Note that the control signal conversion unit 421 of the present modified example generates a control signal for performing a selection process, as indicated in the following (1) and (2), and outputs the generated control signal to the selector 422.

(1) In the case where a frame influenced by incoming flash light has been detected within the six frame period, a control signal is generated so that a process for selecting an image signal corresponding to six frames (a process for selecting all six frames) is performed.

(2) In the case where a frame influenced by incoming flash light has not been detected within the six frame period, a control signal is generated so that a process for selecting an image signal corresponding to four central frames, excluding the two frames on either end, in the temporal axis direction (a process for selecting an image signal corresponding to the central four frames) is performed.

Then, in the case of the aforementioned (1), the adder according to the present modified example (corresponding to the adder 423 of the above embodiments) performs an adding process and a gain process based on the gain G1, whereas in the case of the aforementioned (2), the adder performs only the adding process.

As described thus far, in the present modified example, the image signal Sig_out outputted from the format conversion unit 403 has C19, C20, and C21 as its center in the temporal axis direction, as shown in FIG. 15, and therefore is an image signal whose center is not shifted in the temporal axis direction. As a result, video formed from captured images obtained by the imaging apparatus according to the present modified example is natural video.

[Other Embodiments]

The above second and third embodiments describe the number of frames on which the average computation unit performs average computation as being fixed (in the case of FIG. 6, the number of frames for average computation is "2", whereas in the case of FIG. 7, the number of frames for average computation is "4"). However, the technique is not limited thereto; the number of frames on which the average computation unit performs average computation may be made variable, and the frames may be selected so as to maintain a constant temporal center.

Figure 8:
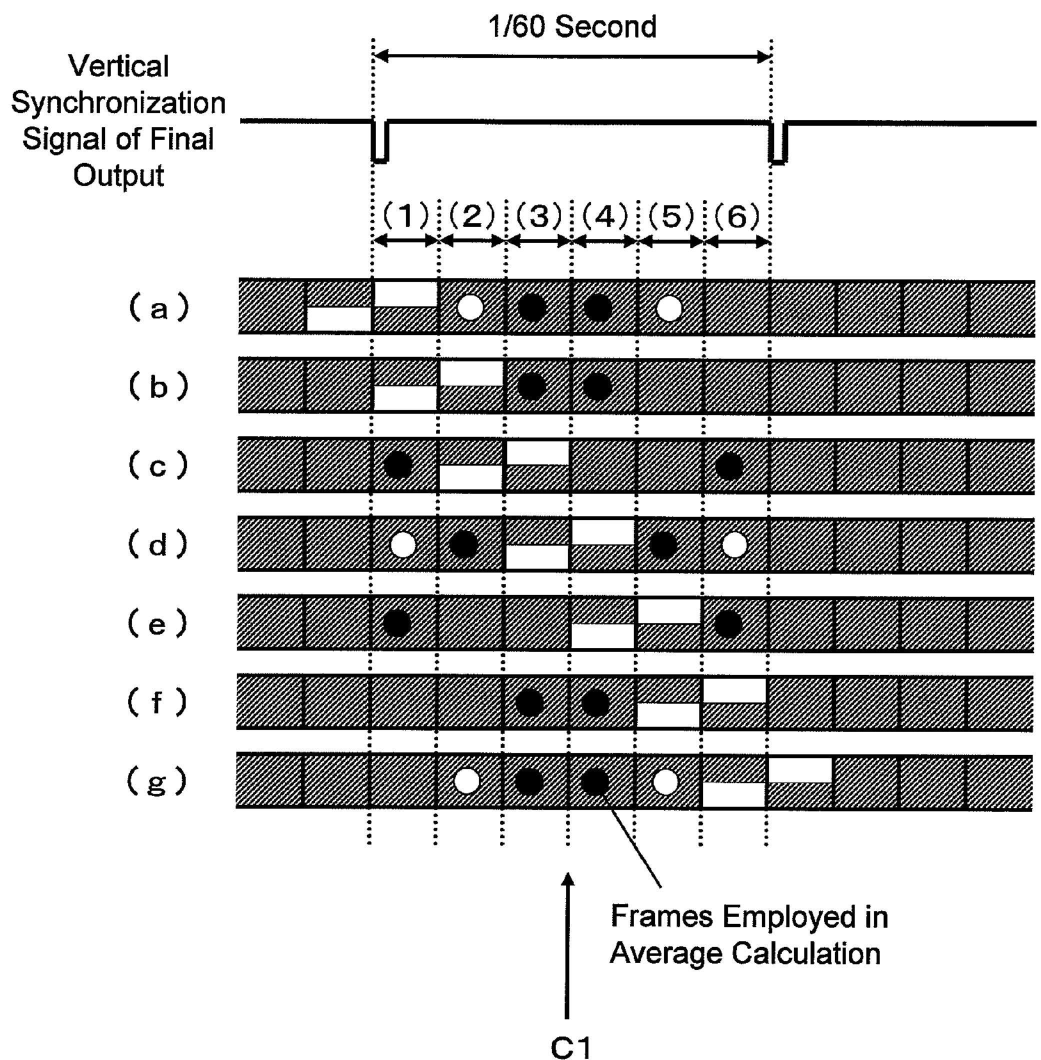
FIG. 8 is a diagram illustrating a frame selection method in an imaging apparatus according to another embodiment.

This shall be described using FIG. 8, which is similar to FIG. 6.

As shown in FIG. 8, in the case of phase relationships (a), (d), and (g), the number of frames on which the average computation unit performs average computation is set to "4", and the frames on which the average computation unit performs average computation are the frames indicated by black circles and the frames indicated by white circles. In this case, the number of frames on which the average computation unit performs average computation increases from "2" to "4"; however, because a constant temporal center is maintained, the same effects as described in the above second embodiment can be achieved. Furthermore, when the aforementioned processing is employed in an imaging apparatus, the number of frames on which the average computation unit performs average computation can be increased, and thus an effect in which the SN ratio of the image (video) obtained by the imaging apparatus is improved can also be achieved.

Although the above descriptions assume that n=6, and correspond to the second embodiment, it goes without saying that the same applies to when n=8 (that is, corresponds to the third embodiment).

Although the aforementioned embodiments describe cases where n is a predetermined number (in the first embodiment, n=4; in the second embodiment, n=6; and in the third embodiment, n=8), the technique is not limited thereto, and n may be an integer that is an even larger number.

In the an imaging apparatus that was described in the foregoing embodiments, the blocks can be independently processed into single chips, or into single chips that include some or all of the blocks, by a semiconductor device such as an LSI.

It should be noted that here this is an LSI, but depending on differences in the degree of integration, it may be referred to as an IC, system LSI, super LSI, or ultra LSI.

The method of circuit integration is not limited to LSI, and this can also be achieved with a dedicated circuit or a generalized processor. After fabrication of the LSI, it is possible to use a programmable FPGA (Field Programmable Gate Array) or a reconfigurable processor in which the connections and settings of the circuit cells within the LSI can be reconfigured.

Further, if other technologies that improve upon or are derived from semiconductor technologies lead to integration technology that supplants LSI, then of course it is also possible to integrate the functional blocks using that technology. Biotechnology applications are one possibility.

The various processes of the foregoing embodiment can be achieved by hardware or software. They also can be achieved by a processing mixture of hardware and software. It should be noted that if the imaging apparatus according to the foregoing embodiments is to be achieved by hardware, then it is of course necessary to perform timing correction for carrying out the various processes. For the sake of simplifying the description, the above embodiments did not include a detailed discussion of the timing adjustment for the various signals that occurs in the actual hardware design.

It should be noted that the specific configuration of the invention is not limited to the embodiments discussed above, and various modifications and revisions are possible within a scope that does not deviate from the gist of the invention.

[Industrial Applicability]

The imaging apparatus, imaging method, program, and integrated circuit according to the present technique can eliminate horizontal bands of high luminance caused by incoming flash light and output an image whose continuity as a moving picture is maintained, and thus are extremely useful in digital cameras, video cameras, and so on that capture continuous images. High-speed driving of recent CMOS image sensor imaging elements is also possible, and thus the utility is high.

APPENDIXES

Note that the present technique can also be implemented as follows.

A first aspect is an imaging apparatus including an imaging unit, a flashing light detection unit, and a format conversion unit.

The imaging unit has an image sensor, drives the image sensor at a frame rate n times that of a predetermined video format (where n is an integer of 2 or more), and converts an optical signal entering the image sensor into an electric signal, thereby obtaining an n time-speed image signal. The flashing light detection unit detects incoming flash light in the n time-speed image signal obtained by the imaging unit and outputs a flashing light detection signal indicating the result of detecting the incoming flash light. The format conversion unit outputs a image signal compliant with the predetermined video format by selecting image signals to be processed based upon the flashing light detection signal when generating the image signal compliant with the predetermined video format from the n time-speed image signal obtained by the imaging unit.

With this imaging apparatus, the format conversion unit converts the n time-speed image signal obtained by the imaging unit into the predetermined video format based on the flashing light detection signal so as to ensure the continuity of the image signal as a moving picture. For example, with this imaging apparatus, all of the frames influenced by flashing light are removed or all the frames influenced by flashing light are included (in other words, a middling process whereby a frame in which only the upper section of the screen is influenced by flashing light is included, and the following frame, in which only the lower section of the screen is influenced by flashing light, is excluded, is not performed), and thus the appearance of horizontal bands of high luminance can be prevented in the image signal in the predetermined video format, which is the fmal output (for example, an image signal having a frame frequency of 60 Hz corresponds to this). Furthermore, with this imaging apparatus, an image signal having a frame rate n times (where n is an integer of 2 or more) that of the predetermined video format (the n time-speed video signal) is the processing target; the process for eliminating the influence of flashing light is performed, after which format conversion is carried out, and an image signal having a 1× frame rate (an image signal in the predetermined video format) is thus outputted. In other words, with this imaging apparatus, the same frame image (a 1× frame image) is not outputted continuously multiple times. As a result, the continuity of the image signal as a moving picture can be maintained when the image signal obtained by the imaging apparatus is displayed in a display apparatus.

A second aspect is the first aspect, in which n is an integer of 3 or more. The format conversion unit includes an average computation unit and a speed conversion unit.

The average computation unit is controlled by the flashing light detection signal and, in the case where flashing light has been detected by the flashing light detection unit, obtains an average image signal by removing the images of frames containing flashing light from n frames' worth of the n time-speed image signal based on the flashing light detection signal and calculating the average of each pixel in the n time-speed image signal forming the frames aside from the frames that have been removed, and in the case where flashing light has not been detected by the flashing light detection unit, obtains an average image signal by calculating the average of each pixel in the n frames' worth of the n time-speed image signal. The speed conversion unit converts the average image signal into 1/n speed, thereby outputting an image signal that matches the timing of the predetermined video format.

This imaging apparatus includes an imaging unit driven at n times-speed and an average computation unit that removes frame images in which incoming flash light has been detected, calculate an average value thereof, and outputs an image signal; therefore, the appearance of horizontal bands of high luminance can be prevented in the image signal in the predetermined video format, which is the final output (for example, an image signal having a frame frequency of 60 Hz corresponds to this), and the same frame image is not outputted continuously multiple times. Therefore, the continuity of the image signal as a moving picture can be maintained when the image signal obtained by the imaging apparatus is displayed in a display apparatus.

A third aspect is the second aspect, in which n is an integer of 5 or more, and assuming that frame numbers from 1 to n have been assigned to n continuous frames formed by the n time-speed image signal, the average computation unit obtains the average image signal by selecting, from frames in which flashing light has not been detected, frames on which to perform average computation so that the average of the frame numbers is (n+1)/2, and calculating the average of each of the pixels in the frames.

With this imaging apparatus, the average computation unit selects the frames of which the average is to be calculated so that the average of the frame numbers is (n+1)/2. Through this, frames that correspond to each other on the right and left in time series can be employed in the average calculation, and thus the temporal center can always be held constant. Therefore, with this imaging apparatus, the image signal that is the final output is generated from frames whose temporal center is always held constant, and thus the image (video) obtained by this imaging apparatus is smooth as a moving picture.

A fourth aspect is the first aspect, in which the format conversion unit outputs an image signal that matches the timing of the predetermined video format by adding n frames' worth of the n time-speed image signal obtained by the imaging unit, and determines n frames' worth of frames on which to perform the adding in accordance with the timing at which frames influenced by flashing light have been detected by the flashing light detection unit based on the flashing light detection signal.

With this imaging apparatus, the format conversion unit determines n frames' worth of frames on which to perform the adding in accordance with the timing at which frames influenced by flashing light have been detected by the flashing light detection unit based on the flashing light detection signal, and adds the image signals of the determined frames. Therefore, with this imaging apparatus, horizontal bands of high luminance caused by incoming flash light can be eliminated, and an image (image signal) whose continuity as a moving picture has been improved can be outputted.

A fifth aspect is the fourth aspect, in which in the case where continuous frames influenced by incoming flash light have been detected by the flashing light detection unit, the format conversion unit performs a process for adding n frames' worth of the n time-speed image signal by including the continuous frames influenced by incoming flash light in n frames to be added.

A sixth aspect is the fourth or the fifth aspect, in which the format conversion unit includes a memory, a selector, and an adder.

The memory stores (n+2) frames' worth of an image signal. The selector selects n frames' worth of the (n+2) frames' worth of the image signal stored in the memory. The adder adds the n frames' worth of the image signal selected by the selector.

Then, in the case where continuous frames influenced by incoming flash light have been detected by the flashing light detection unit, the selector includes the image signal of the continuous frames influenced by incoming flash light in the selected n frames' worth of image signal.

With this imaging apparatus, when continuous frames influenced by incoming flash light have been detected by the flashing light detection unit, those continuous frames influenced by incoming flash light can be taken as the adding target with certainty. Therefore, with this imaging apparatus, horizontal bands of high luminance caused by incoming flash light can be eliminated, and an image (image signal) whose continuity as a moving picture has been improved can be outputted.

A seventh aspect is an imaging method used in an imaging apparatus provided with an imaging unit, having an image sensor, that drives the image sensor at a frame rate n times that of a predetermined video format (where n is an integer of 2 or more) and converts an optical signal entering the image sensor into an electric signal, thereby obtaining an n time-speed image signal. This imaging method includes a step of detecting flashing light and a step of format conversion.

In the flashing light detection step, incoming flash light in the n time-speed image signal obtained by the imaging unit is detected and a flashing light detection signal indicating the result of detecting the incoming flash light is outputted. In the format conversion step, a image signal compliant with the predetermined video format is outputted by selecting image signals to be processed based upon the flashing light detection signal when the format conversion step generates the image signal compliant with the predetermined video format from the n time-speed image signal obtained by the imaging unit.

Through this, an imaging method that achieves the same effects as the first aspect can be achieved.

An eighth aspect is a storage medium storing a program that causes a computer to execute an imaging method used in an imaging apparatus provided with an imaging unit, having an image sensor, that drives the image sensor at a frame rate n times that of a predetermined video format (where n is an integer of 2 or more) and converts an optical signal entering the image sensor into an electric signal, thereby obtaining an n time-speed image signal. The imaging method includes a step of detecting flashing light and a step of format conversion.

In the flashing light detection step, incoming flash light in the n time-speed image signal obtained by the imaging unit is detected and a flashing light detection signal indicating the result of detecting the incoming flash light is outputted. In the format conversion step, a image signal compliant with the predetermined video format is outputted by selecting image signals to be processed based upon the flashing light detection signal when the format conversion step generates the image signal compliant with the predetermined video format from the n time-speed image signal obtained by the imaging unit.

Through this, a storage medium storing a program that causes a computer to execute an imaging method that achieves the same effects as the first aspect can be achieved.

A ninth aspect is an integrated circuit used in an imaging apparatus provided with an imaging unit, having an image sensor, that drives the image sensor at a frame rate n times that of a predetermined video format (where n is an integer of 2 or more) and converts an optical signal entering the image sensor into an electric signal, thereby obtaining an n time-speed image signal. This integrated circuit includes a flashing light detection unit and a format conversion unit.

The flashing light detection unit detects incoming flash light in the n time-speed image signal obtained by the imaging unit and outputs a flashing light detection signal indicating the result of detecting the incoming flash light. The format conversion unit outputs a image signal compliant with the predetermined video format by selecting image signals to be processed based upon the flashing light detection signal when generating the image signal compliant with the predetermined video format from the n time-speed image signal obtained by the imaging unit.

Through this, an integrated circuit that achieves the same effects as the first aspect can be achieved.

What is claimed is:

1. An imaging apparatus comprising:

an imaging unit, having an image sensor, that drives the image sensor at a frame rate n times that of a predetermined video format (where n is an integer of 2 or more) and converts an optical signal entering the image sensor into an electric signal, thereby obtaining an n time-speed image signal;

a flashing light detection unit that detects incoming flash light in the n time-speed image signal obtained by the imaging unit and outputs a flashing light detection signal indicating the result of detecting the incoming flash light; and a format conversion unit that outputs an image signal compliant with the predetermined video format by selecting image signals to be processed based upon the flashing light detection signal when generating the image signal compliant with the predetermined video format from the n time-speed image signal obtained by the imaging unit, wherein the format conversion unit includes:

an average computation unit, controlled by the flashing light detection signal, that, in the case where flashing light has been detected by the flashing light detection unit, obtains an average image signal by removing the images of frames containing flashing light from n frames' worth of the n time-speed image signal based on the flashing light detection signal and calculating the average of each pixel in the n time-speed image signal forming the frames aside from the frames that have been removed, and in the case where flashing light has not been detected by the flashing light detection unit, obtains an average image signal by calculating the average of each pixel in the n frames' worth of the n time-speed image signal; and a speed conversion unit that converts the average image signal into 1/n speed, thereby outputting an image signal that matches the timing of the predetermined video format.

2. The imaging apparatus according to claim 1, wherein n is an integer of 5 or more, and assuming that frame numbers from 1 to n have been assigned to n continuous frames formed by the n time-speed image signal, the average computation unit obtains the average image signal by selecting, from frames in which flashing light has not been detected, frames on which to perform average computation so that the average of the frame numbers is (n+1)/2, and calculating the average of each of the pixels in the frames.

3. The imaging apparatus according to claim 1, wherein n is an integer of 3 or more.

4. An imaging apparatus comprising:

an imaging unit, having an image sensor, that drives the image sensor at a frame rate n times that of a predetermined video format (where n is an integer of 2 or more) and converts an optical signal entering the image sensor into an electric signal, thereby obtaining an n time-speed image signal;

a flashing light detection unit that detects incoming flash light in the n time-speed image signal obtained by the imaging unit and outputs a flashing light detection signal indicating the result of detecting the incoming flash light; and a format conversion unit that outputs an image signal compliant with the predetermined video format by selecting image signals to be processed based upon the flashing light detection signal when generating the image signal compliant with the predetermined video format from the n time-speed image signal obtained by the imaging unit, wherein the format conversion unit outputs an image signal that matches the timing of the predetermined video format by adding n frames' worth of the n time-speed image signal obtained by the imaging unit, and determines n frames' worth of frames on which to perform the adding in accordance with the timing at which frames influenced by flashing light have been detected by the flashing light detection unit based on the flashing light detection signal.

5. The imaging apparatus according to claim 4, wherein in the case where continuous frames influenced by incoming flash light have been detected by the flashing light detection unit, the format conversion unit performs a process for adding n frames' worth of the n time-speed image signal by including the continuous frames influenced by incoming flash light in n frames to be added.

6. The imaging apparatus according to claim 4, wherein the format conversion unit includes:

a memory that stores (n +2) frames' worth of an image signal;

a selector that selects n frames' worth of the (n +2) frames' worth of the image signal stored in the memory; and an adder that adds the n frames' worth of the image signal selected by the selector, wherein in the case where continuous frames influenced by incoming flash light have been detected by the flashing light detection unit, the selector includes the image signal of the continuous frames influenced by incoming flash light in the selected n frames' worth of image signal.

7. An imaging method used in an imaging apparatus provided with an imaging unit, having an image sensor, wherein the imaging unit drives the image sensor at a frame rate n times that of a predetermined video format (where n is an integer of 2 or more) and converts an optical signal entering the image sensor into an electric signal, thereby obtaining an n time-speed image signal, the method comprising:

detecting incoming flash light in the n time-speed image signal obtained by the imaging unit and outputting a flashing light detection signal indicating the result of detecting the incoming flash light; and outputting an image signal compliant with the predetermined video format by selecting image signals to be processed based upon the flashing light detection signal when generating the image signal compliant with the predetermined video format from the n time-speed image signal obtained by the imaging unit, wherein said outputting of an image signal compliant with the predetermined video format includes:

an average computation step, controlled by the flashing light detection signal, of in the case where flashing light has been detected by said detecting incoming flash light, obtaining an average image signal by removing the images of frames containing flashing light from n frames' worth of the n time-speed image signal based on the flashing light detection signal and calculating the average of each pixel in the n time-speed image signal forming the frames aside from the frames that have been removed, and in the case where flashing light has not been detected by the flashing light detection unit, obtaining an average image signal by calculating the average of each pixel in the n frames' worth of the n time-speed image signal; and a speed conversion step of converting the average image signal into 1/n speed, thereby outputting an image signal that matches the timing of the predetermined video format.

8. The imaging method according to claim 7, wherein n is an integer of 3 or more.

9. A non-transitory storage medium storing a program causing a computer to execute an imaging method used in an imaging apparatus provided with an imaging unit, having an image sensor, wherein the imaging unit drives the image sensor at a frame rate n times that of a predetermined video format (where n is an integer of 2 or more) and converts an optical signal entering the image sensor into an electric signal, thereby obtaining an n time-speed image signal, the method comprising:

detecting incoming flash light in the n time-speed image signal obtained by the imaging unit and outputting a flashing light detection signal indicating the result of detecting the incoming flash light; and outputting an image signal compliant with the predetermined video format by selecting image signals to be processed based upon the flashing light detection signal when generating the image signal compliant with the predetermined video format from the n time-speed image signal obtained by the imaging unit wherein said outputting of an image signal compliant with the predetermined video format includes:

an average computation step, controlled by the flashing light detection signal, of, in the case where flashing light has been detected by said detecting incoming flash light, obtaining an average image signal by removing the images of frames containing flashing light from n frames' worth of the n time-speed image signal based on the flashing light detection signal and calculating the average of each pixel in the n time-speed image signal forming the frames aside from the frames that have been removed, and in the case where flashing light has not been detected by the flashing light detection unit, obtaining an average image signal by calculating the average of each pixel in the n frames' worth of the n time-speed image signal; and a speed conversion step of converting the average image signal into 1/n speed, thereby outputting an image signal that matches the timing of the predetermined video format.

10. The non transitory storage medium according to claim 9, wherein n is an integer of 3 or more.

11. An integrated circuit used in an imaging apparatus provided with an imaging unit, having an image sensor, wherein the imaging unit drives the image sensor at a frame rate n times that of a predetermined video format (where n is an integer of 2 or more) and converts an optical signal entering the image sensor into an electric signal, thereby obtaining an n time-speed image signal, the integrated circuit comprising:

a flashing light detection unit that detects incoming flash light in the n time-speed image signal obtained by the imaging unit and outputs a flashing light detection signal indicating the result of detecting the incoming flash light; and a format conversion unit that outputs an image signal compliant with the predetermined video format by selecting image signals to be processed based upon the flashing light detection signal when generating the image signal compliant with the predetermined video format from the n time-speed image signal obtained by the imaging unit, wherein the format conversion unit includes:

an average computation unit, controlled by the flashing light detection signal, that, in the case where flashing light has been detected by the flashing light detection unit, obtains an average image signal by removing the images of frames containing flashing light from n frames' worth of the n time-speed image signal based on the flashing light detection signal and calculating the average of each pixel in the n time-speed image signal forming the frames aside from the frames that have been removed, and in the case where flashing light has not been detected by the flashing light detection unit, obtains an average image signal by calculating the average of each pixel in the n frames' worth of the n time-speed image signal; and a speed conversion unit that converts the average image signal into 1/n speed, thereby outputting an image signal that matches the timing of the predetermined video format.

12. The integrated circuit according to claim 11, wherein n is an integer of 3 or more.

* * * * *